(12) United States Patent
Tsuga

(10) Patent No.: US 6,863,635 B2
(45) Date of Patent: Mar. 8, 2005

(54) SPEED CHANGE MECHANISM OF AUTOMATIC TRANSMISSION

(75) Inventor: Koichiro Tsuga, Shizuoka (JP)

(73) Assignee: JATCO Ltd., Fuji (JP)

(*) Notice: Subject to any disclaimer, the term of this patent is extended or adjusted under 35 U.S.C. 154(b) by 0 days.

(21) Appl. No.: 10/614,827

(22) Filed: Jul. 9, 2003

(65) Prior Publication Data

US 2004/0014551 A1 Jan. 22, 2004

(30) Foreign Application Priority Data

Jul. 16, 2002 (JP) .................................. 2002-207381

(51) Int. Cl.$^7$ ................................................ F16H 3/62
(52) U.S. Cl. ............................... 475/275; 475/284
(58) Field of Search ........................... 475/275, 284

(56) References Cited

U.S. PATENT DOCUMENTS

| | | | | |
|---|---|---|---|---|
| 6,110,069 A | * | 8/2000 | Taniguchi et al. | 475/330 |
| 6,120,410 A | * | 9/2000 | Taniguchi et al. | 475/285 |
| 6,139,463 A | * | 10/2000 | Kasuya et al. | 475/275 |
| 6,176,802 B1 | * | 1/2001 | Kasuya et al. | 475/269 |

FOREIGN PATENT DOCUMENTS

JP        2000-55152 A        2/2000

OTHER PUBLICATIONS

U.S. Appl. No. 10/619,724, filed Jul. 16, 2003, Ishimaru.
U.S. Appl. No. 10/446,869, filed May 29, 2003, Tsuga.
U.S. Appl. No. 10/619,559, filed Jul. 16, 2003, Taguchi.
U.S. Appl. No. 10/617,788, filed Jul. 14, 2003, Choi.
U.S. Appl. No. 10/619,459, filed Jul. 16, 2003, Ishimaru.
U.S. Appl. No. 10/617,787, filed Jul. 14, 2003, Ikeda.

* cited by examiner

Primary Examiner—Dirk Wright
(74) Attorney, Agent, or Firm—Foley & Lardner LLP

(57) ABSTRACT

A first planetary gear unit is arranged to output a reduced speed rotation upon receiving a rotation from a prime mover. A speed change unit is arranged to which the reduced speed rotation is applied from the first planetary gear unit. The speed change unit is arranged at an opposite position of the prime mover with respect to the first planetary gear unit. An oil pump is arranged between the first planetary gear unit and the prime mover and driven by the prime mover. The oil pump includes a case to which the sun gear of the first planetary gear unit is connected. Friction elements are arranged to selectively engage and disengage rotation members of the first planetary gear unit and the speed change unit for achieving a desired speed position. A direct clutch is arranged to directly transmit the rotation from the prime mover to the speed change unit. The direct clutch includes an annular clutch pack which is concentrically disposed around the first planetary gear unit and a clutch piston which is arranged at an opposite position of the oil pump with respect to the first planetary gear unit.

13 Claims, 13 Drawing Sheets

| POSITION | | FRICTION ELEMENT | C1 | C2 | C3 | B1 | B2 |
|---|---|---|---|---|---|---|---|
| FORWARD | 1st | | ○ | | | ○ | |
| | 2nd | | ○ | | | | ○ |
| | 3rd | | ○ | ○ | | | |
| | 4th | | ○ | | ○ | | |
| | 5th | | | ○ | ○ | | |
| | 6th | | | | ○ | | ○ |
| REVERSE | | | | ○ | | ○ | |

1st FORWARD SPEED

2nd FORWARD SPEED

3rd FORWARD SPEED

4th FORWARD SPEED

5th FORWARD SPEED

6th FORWARD SPEED

REVERSE

1st FORWARD SPEED

2nd FORWARD SPEED

3rd FORWARD SPEED

4th FORWARD SPEED

5th FORWARD SPEED

6th FORWARD SPEED

REVERSE

SPEED CHANGE MECHANISM OF AUTOMATIC TRANSMISSION

BACKGROUND OF THE INVENTION

1. Field of the Invention

The present invention relates in general to speed change mechanisms of an automatic transmission for a wheeled motor vehicle, and more particularly to the speed change mechanisms of a type used for a power transmission arrangement in which an engine, an oil pump driven by the engine, a speed reduction planetary gear unit for reducing the speed of rotation from the engine and a speed change unit inputting thereinto the speed reduced rotation are coaxially arranged and a direct clutch for directly transmitting the rotation from the engine to the speed change unit is disposed around the speed reduction planetary gear unit.

2. Description of the Related Art

Hitherto, for the purpose of improving fuel consumption and drivability of wheeled motor vehicles, various multi-speed type automatic transmissions have been proposed and put into practical use. One of the speed change mechanisms of such type is shown in Japanese Laid-open Patent Application (Tokkai) 2000-55152.

The speed change mechanism of this published application comprises generally a speed reduction planetary gear unit that reduces the speed of rotation from an engine, a speed change unit that is arranged behind the planetary gear unit and a direct clutch that directly transmits rotation from the engine to the speed change unit. The speed change unit includes second and third planetary gear units, clutches and brakes. By selectively engaging and disengaging the direct clutch, the clutches and brakes, multi-forward speeds and a reverse position are achieved by the speed change mechanism.

For fulfilling the need of reducing the input rotation from an engine, the speed reduction planetary gear unit has a sun gear fixed to a fixed member and makes one of a ring gear and a pinion carrier serve as a rotation input member and the other of them serve as a rotation output member.

The rotation input member is connected to an input shaft of the transmission, and the rotation output member is connected to a selected one of rotation members of the speed change unit through a clutch.

In the above-mentioned speed change mechanism, an oil pump driven by the engine is arranged between the engine and the speed reduction planetary gear unit, the sun gear of the speed reduction planetary gear unit is tightly disposed on a cylindrical boss portion formed on a pump case, and the direct clutch is arranged to surround the speed reduction planetary gear unit. For controlling the clutches and brakes, a hydraulic controller is provided which comprises a control valve body fixed to a transmission case. Within the control valve body, a hydraulic pressure is generated based on a base pressure produced by the oil pump, and the hydraulic pressure is led, through oil passages formed in the pump case, to work chambers of the clutches and brakes to selectively engage and disengage the same.

In the above-mentioned speed change mechanism, an annular piston of the direct clutch is placed near the oil pump and arranged so that an inner cylindrical surface of the annular piston is axially slidably received on the cylindrical boss portion of the pump case having a seal ring interposed therebetween.

SUMMARY OF THE INVENTION

However, placing the annular piston at the position near the oil pump causes inevitable increase the length of the boss portion of the pump case because a certain moved distance is needed by the annular piston for operating the direct clutch.

However, as is understood, increase in length of the boss portion induces a lowering in a flexural and torsional rigidity of the boss portion, and thus, it tends to occur that the boss portion fails to exhibit a satisfied holding function against the sun gear of the speed reduction planetary gear unit. Of course, providing the boss portion with a larger diameter may solve such drawback. However, in this case, enlargement of the speed change mechanism in a radial direction is not avoided.

Accordingly, an object of the present invention is to provide a speed change mechanism of an automatic transmission, which is free of the above-mentioned drawback.

According to the present invention, there is provided a speed change mechanism of an automatic transmission, which comprises a first planetary gear unit which includes a sun gear, a rotation input member and a rotation output member, the first planetary gear unit outputting a reduced speed rotation from the rotation output member upon receiving a rotation from a prime mover by the rotation input member; a speed change unit to which the reduced speed rotation is applied from the rotation output member of the first planetary gear unit, the speed change unit being arranged at an opposite position of the prime mover with respect to the first planetary gear unit; an oil pump arranged between the first planetary gear unit and the prime mover and driven by the prime mover, the oil pump including a case to which the sun gear of the first planetary gear unit is connected; friction elements which selectively engage and disengage the rotation input and output members of the first planetary gear unit and rotation members of the speed change unit for achieving a desired speed position; and a direct clutch arranged to directly transmit the rotation from the prime mover to the speed change unit, the direct clutch including an annular clutch pack which is concentrically disposed around the first planetary gear unit and a clutch piston which is arranged at an opposite position of the oil pump with respect to the first planetary gear unit for actuating the annular clutch pack.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, two embodiments 100 and 200 of the present invention will be described in detail with reference to the accompanying drawings.

Figures 1, 2:
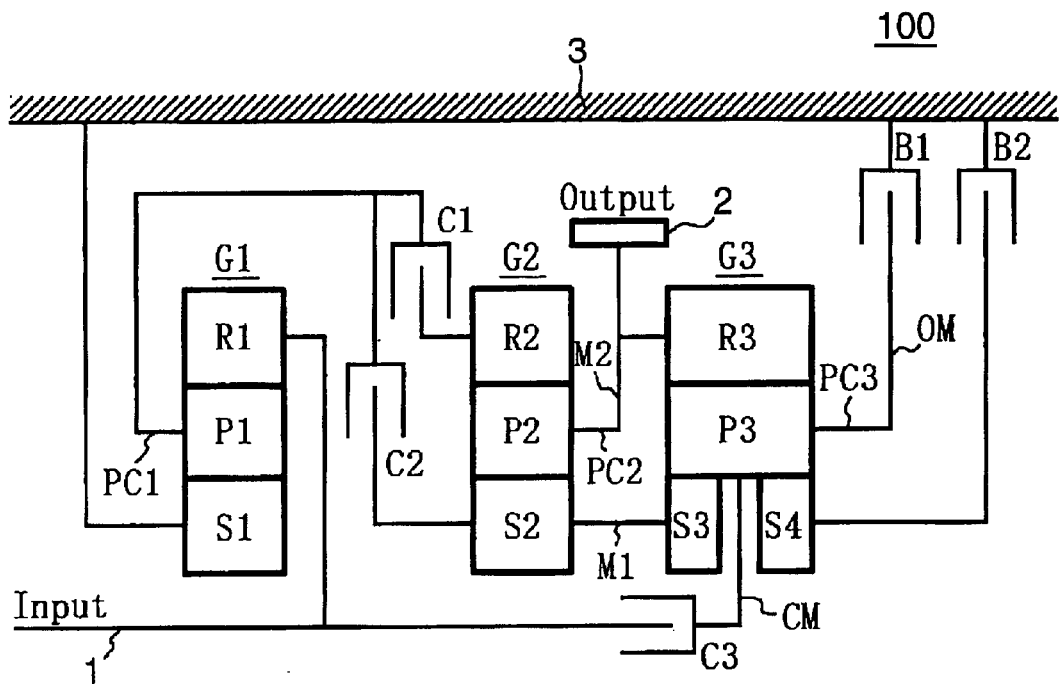
FIG. 1 is a schematic view of a speed change mechanism of an automatic transmission, which is a first embodiment of the present invention.
FIG. 2 is a Table showing ON/OFF condition of each friction element with respect to six forward speeds and a reverse position established in the speed change mechanism of the first embodiment.

FIG. 1 shows schematically a speed change mechanism 100 of the first embodiment of the present invention.

As shown in the drawing, the speed change mechanism 100 comprises generally a first planetary gear unit G1, a second planetary gear unit G2, a third planetary gear unit G3, a first connecting member M1, a second connecting member M2, a first clutch C1, a second clutch C2, a third clutch C3, a first brake B1, a second brake B2, an input shaft 1 and an output gear 2.

In the speed change mechanism 100, the first and second planetary gear units G1 and G2 are of a single pinion type and the third planetary gear unit G3 is of a double sun gear type. The first, second and third planetary gear units G1, G2 and G3 are coaxially arranged. The first planetary gear unit G1 constitutes a speed reduction unit and the second and third planetary gears G2 and G3 are arranged to constitute a speed change unit.

The first planetary gear unit G1 comprises a first sun gear S1, a first ring gear R1, first pinions P1 each being meshed with both the first sun and ring gears S1 and R1 and a first pinion carrier PC1 carrying the first pinions P1.

The second planetary gear unit G2 comprises a second sun gear S2, a second ring gear R2, second pinions P2 each being meshed with both the second run and ring gears S2 and R2 and a second pinion carrier PC2 carrying the second pinions P2.

The third planetary gear unit G3 comprises a third sun gear S3 located near the input shaft 1, a fourth sun gear S4 located away from the input shaft 1, a third ring gear R3, third pinions P3 each being meshed with the third and fourth sun gears S3 and S4 and the third ring gear R3 and a third pinion carrier PC3 carrying the third pinions P3.

The third sun gear S3 and the fourth sun gear S4 are coaxially arranged, but these gears S3 and S4 need not have the same number of teeth.

Between the third and fourth sun gears S3 and S4, there is provided a center member CM which extends radially outwardly from the third pinion carrier PC3, and from the third pinion carrier PC3, there extends radially outwardly an outer member OM.

As will be described in detail hereinafter, the outer member OM has a unique arrangement.

The center member CM is connected to the third pinion carrier PC3 at spaced positions of the third pinions P3 which are placed in the vicinity of a periphery of the third pinion carrier PC3.

Although not shown in the drawing, the input shaft 1 is connected to an internal combustion engine through a torque converter, so that a torque produced by the engine is transmitted to the input shaft 1 through the torque converter.

As shown, the first ring gear R1 is connected to the input shaft 1.

The output gear 2 is concentrically arranged around the input shaft 1 and connected to the second pinion carrier PC2 and the third ring gear R3 through the second connecting member M2, so that an output torque from the output gear 2 is transmitted to driven road wheels (not shown) through a final gear unit (not shown) and a differential gear unit (not shown).

The first connecting member M1 connects the second sun gear S2 and the third sun gear S3.

The first sun gear S1 is fixed to a case 3 of the transmission, and the first pinion carrier PC1 is connectable to the second ring gear R2 through the first clutch C1 and connectable to the second sun gear S2 through the second clutch C2.

The center member CM of the third pinion carrier PC3 is connectable to the input shaft 1 through the third clutch C3. Thus, the third clutch C3 serves as a direct clutch that, when engaged, directly transmits the torque of the input shaft 1 to the speed change unit consisting of the second and third planetary gear units G2 and G3.

The outer member OM of the third pinion carrier PC3 is connectable to the transmission case 3 through the first brake B1, and thus the third pinion carrier PC3 can be selectively fixed. The fourth sun gear S4 is connectable to the transmission case 3 through the second brake B2, and thus the fourth sun gear S4 can be selectively fixed.

For actuating the clutches C1, C2 and C3 and the brakes B1 and B2, there are respectively connected hydraulic actuators (not shown) of a speed change control device.

When the friction elements (viz., clutches C1, C2 and C3 and brakes B1 and B2) are engaged or disengaged by the hydraulically actuating devices in a way as is indicated by the Table of FIG. 2, six forward speeds and one reverse position are selectively obtained by the speed change mechanism 100.

It is to be noted that the Table of FIG. 2 shows the engaged/disengaged condition of each friction element with respect a position (viz., six forward speed positions and one reverse position) assumed by the transmission (viz., speed change mechanism 100). Engaged condition is represented by a circle and disengaged condition is represented by a blank.

In the following, operation of the speed change mechanism 100 will be described with reference to FIGS. 3 to 9 which respectively show 7 types of torque transmitting path established in $1^{st}$, $2^{nd}$, $3^{rd}$, $4^{th}$, $5^{th}$ and $6^{th}$ forward speeds and reverse position of the speed change mechanism 100. In the drawings, each torque transmitting path is indicated by hatched blocks and thicker lines.

$1^{st}$ Forward Speed

As is seen from the Table of FIG. 2, in this forward speed, only the first clutch C1 and first brake B1 assume their engaged condition.

Figure 3:
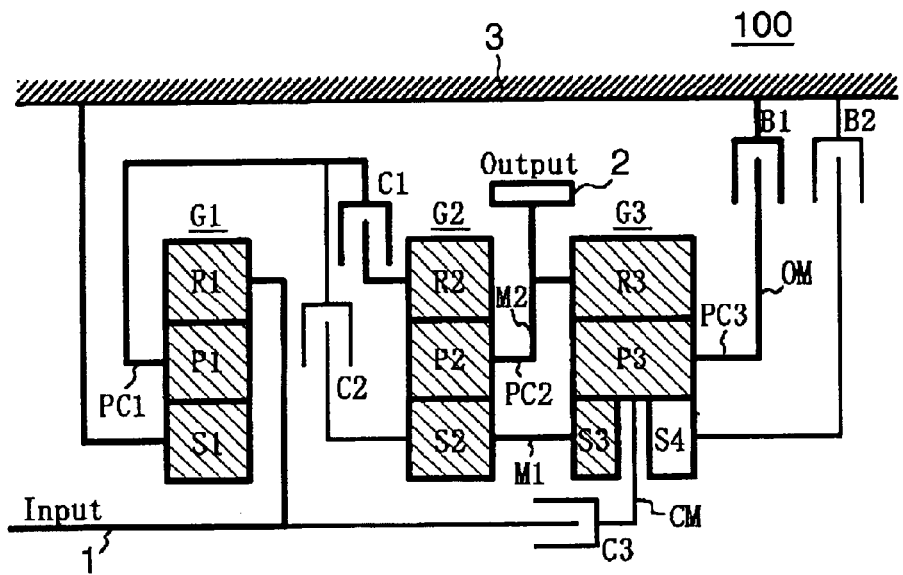
FIGS. 3 to 8 are views similar to FIG. 1, but showing torque transmitting paths established in $1^{st}$, $2^{nd}$, $3^{rd}$, $4^{th}$, $5^{th}$ and $6^{th}$ forward speeds of the speed change mechanism of the first embodiment, respectively.

Under this condition, as is seen from FIG. 3, due to the engaged condition of the first clutch C1, a reduced speed rotation is fed to the second ring gear R2 from the first planetary gear unit G1, and at the same time, due to the engaged condition of the first brake B1 and thus due to fixing of the third pinion carrier PC3 to the transmission case 3, the third sun gear S3 is forced to produce a reduced speed rotation in a reverse direction relative to the rotation of the third ring gear R3. The rotation of the third sun gear S3 is transmitted to the second sun gear S2 of the second planetary gear unit G2 through the first connecting member M1.

Accordingly, into the second planetary gear unit G2, there are inputted a reduced speed rotation in a normal direction from the second ring gear R2 and a reduced speed rotation in a reversed direction from the second sun gear S2, so that a rotation of which rotation speed is much reduced as compared with the reduced speed rotation from the second ring gear R2 is inputted to the output gear 2 through the second connecting member M2.

As is seen from FIG. 3, under this $1^{st}$ forward speed, all of the rotation elements of the first, second and third planetary gear units G1, G2 and G3 except the fourth sun gear S4 are subjected to a torque transmission.

$2^{nd}$ Forward Speed

As is seen from the Table of FIG. 2, in this forward speed, only the first clutch C1 and second brake B2 assume their engaged condition.

Figure 4:
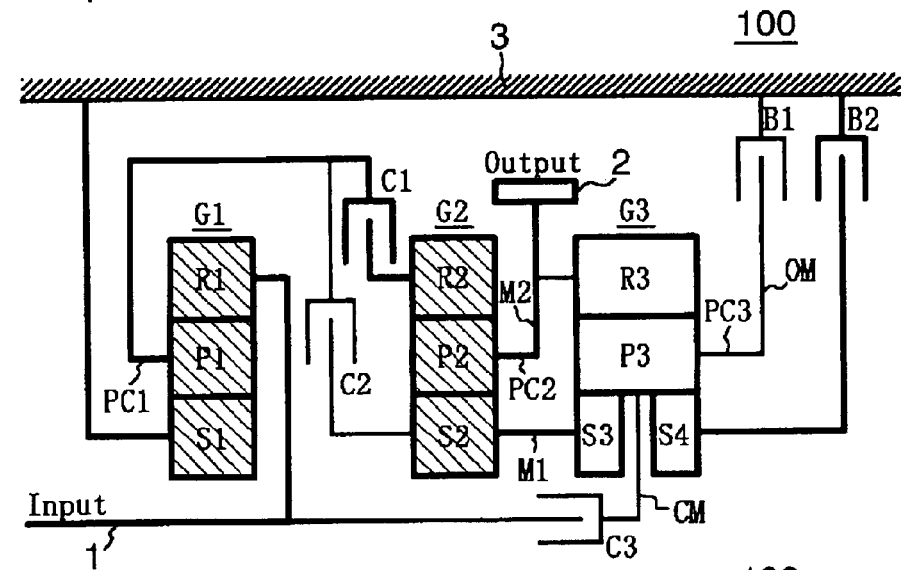

Under this condition, as is seen from FIG. 4, due to the engaged condition of the first clutch C1, a reduced speed rotation is fed to the second ring gear R2 from the first planetary gear unit G1, and at the same time, due to the engaged condition of the second brake B2 and thus due to fixing of the fourth sun gear S4 to the transmission case 3, the third sun gear S3 connected to the fourth sun gear S4 through the third pinions P3 is fixed. Furthermore, the second sun gear S2 connected to the third sun gear S3 through the first connecting member M1 is fixed to the transmission case 3.

Accordingly, into the second planetary gear unit G2, there is inputted a reduced speed rotation in a normal direction from the second ring gear R2. Due to the fixed state of the second sun gear S2, a reduced speed rotation of which speed is somewhat higher than that in the $1^{st}$ forward speed is outputted from the second pinion carrier PC2 to the output gear 2 through the second connecting member M2.

As is seen from FIG. 4, under this $2^{nd}$ forward speed, all of the rotation members of the first and second planetary gear units G1 and G2 are subjected to a torque transmission.

In this $2^{nd}$ forward speed, the released third pinions P3 are turned freely about the fixed third and fourth sun gears S3 and S4 in accordance with rotation of the third ring gear R3, and thus the third planetary gear unit G3 is not subjected to a torque transmission.

$3^{rd}$ Forward Speed

As is seen from the Table of FIG. 2, in this forward speed, only the first clutch C1 and second clutch C2 assume their engaged condition.

Figure 5:
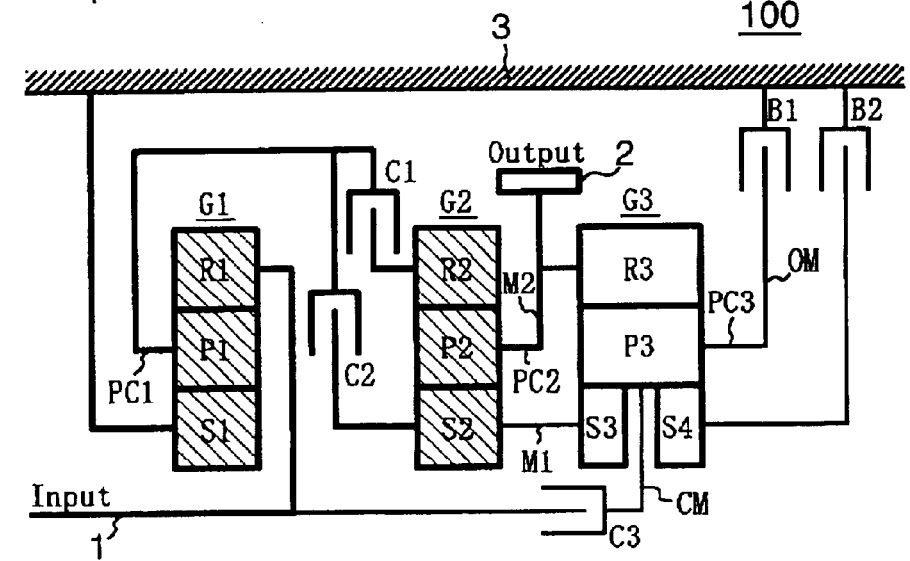

Under this condition, as is seen from FIG. 5, due to the engaged condition of the first clutch C1, a reduced speed rotation is fed to the second ring gear R2 from the first planetary gear unit G1, and at the same time, due to the engaged condition of the second clutch C2, the reduced speed rotation is inputted to the second sun gear S2.

Accordingly, the same reduced speed rotation is inputted to both the second ring gear R2 and the second sun gear S2, and thus from the second pinion carrier PC2, there is outputted a reduced speed rotation of which speed is equal to that of the first planetary gear unit G1 to the output gear 2 through the second connecting member M2.

As is seen from FIG. 5, under this $3^{rd}$ forward speed, all of the rotation members of the first and second planetary gear units G1 and G2 are subjected to a torque transmission. The third planetary gear unit G3 is not subjected to a torque transmission, like in the $2^{nd}$ forward speed.

$4^{th}$ Forward Speed

As is seen from the Table of FIG. 2, in this forward speed, only the first clutch C1 and third clutch C3 assume their engaged condition.

Figure 6:
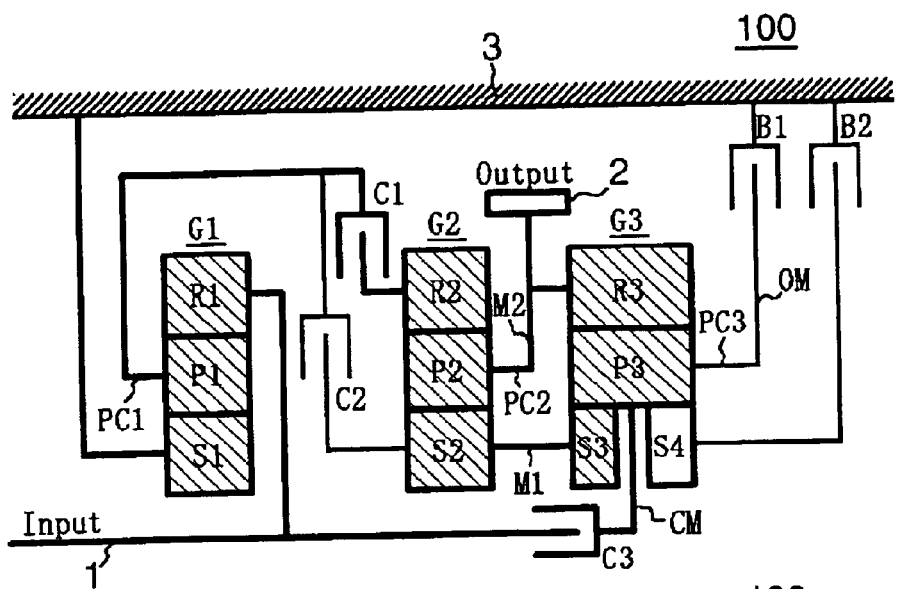

Under this condition, as is seen from FIG. 6, due to the engaged condition of the first clutch C1, a reduced speed rotation is fed to the second ring gear R2 from the first planetary gear unit G1, and at the same time, due to the engaged condition of the third clutch C3, the rotation of the input shaft 1 is inputted to the third pinion carrier PC3 through the center member CM.

Accordingly, a rotation of which speed is higher than that of the third ring gear R3 is transmitted to the second sun gear S2 through the first connecting member M1.

Thus, in the second planetary gear unit G2, a reduced speed rotation is fed to the second ring gear R2 and an increased speed rotation is fed to the second sun gear S2, so that a rotation of which speed is higher than that of the second ring gear R2 is outputted to the output gear 2 through the second pinion carrier PC2 and the second connecting member M2.

As is seen from FIG. 6, under this $4^{th}$ forward speed, all of the rotation members of the first, second and third planetary gear units G1, G2 and G3 except the fourth sun gear S4 are subjected to a torque transmission.

$5^{th}$ Forward Speed

As is seen from the Table of FIG. 2, in this forward speed, only the second clutch C2 and third clutch C3 assume their engaged condition.

Figure 7:
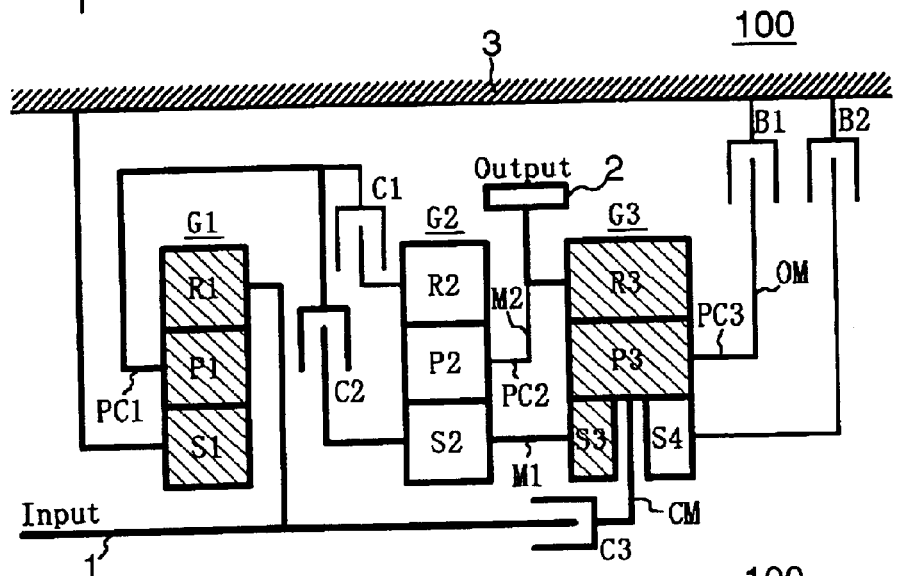

Under this condition, as is seen from FIG. 7, due to the engaged condition of the second clutch C2, a reduced speed rotation is fed from the first planetary gear unit G1 to the third planetary gear unit G3 through the second sun gear S2 and the first connecting member M1, and at the same time, due to the engaged condition of the third clutch C3, an input rotation of the input shaft 1 is fed to the third pinion carrier PC3 through the center member CM.

Accordingly, the rotation of the input shaft 1 is fed to the third pinion carrier PC3 and a speed reduced rotation is fed to the third sun gear S3 from the first planetary gear unit G1, so that a rotation of which speed is higher than that of the input shaft 1 is led to the output gear 2 from the third ring gear R3 through the second connecting member M2.

As is seen from FIG. 7, under this $5^{th}$ forward speed, all of the rotation members of the first and third planetary gear units G1 and G3 except the fourth sun gear S4 are subjected to a torque transmission.

$6^{th}$ Forward Speed

As is seen from the Table of FIG. 2, in this forward speed, only the third clutch C3 and second brake B2 assume their engaged condition.

Figure 8:
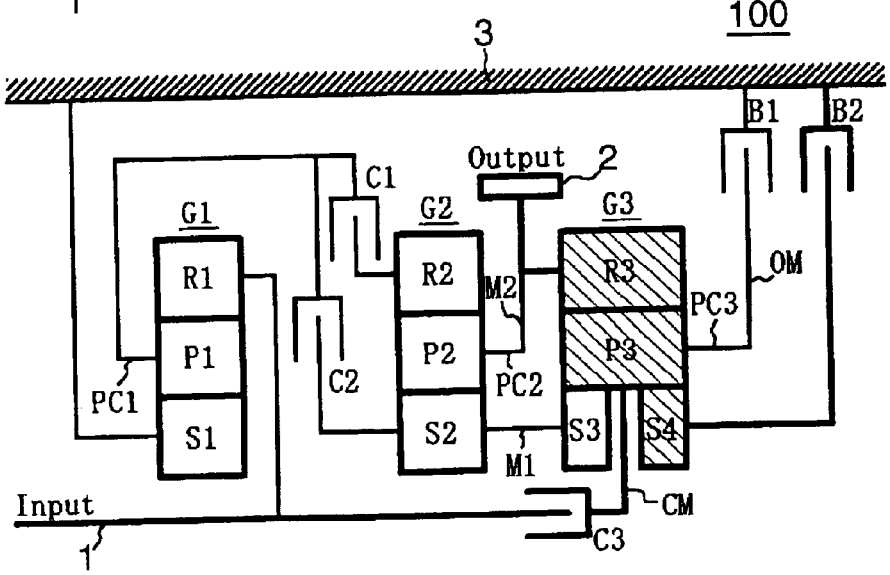

Under this condition, as is seen from FIG. 8, due to the engaged condition of the third clutch C3, the rotation of the input shaft 1 is fed to the third pinion carrier PC3 through the center member CM, and at the same time, due to the engaged condition of the second brake B2, the fourth sun gear S4 is fixed to the transmission case 3.

Accordingly, the rotation of the input shaft 1 is fed to the third pinion carrier PC3, and thus, a rotation of which speed is higher than that of the input shaft 1 is led to the output gear 2 from the third ring gear R3 through the second connecting member M2.

As is seen from FIG. 8, under this 6$^{th}$ forward speed, all of the rotation members of the third planetary gear unit G3 except the third sun gear S3 are subjected to a torque transmission.

Reverse Position

As is seen from the Table of FIG. 2, in this reverse position, only the second clutch C2 and first brake B1 assume their engaged condition.

Figure 9:
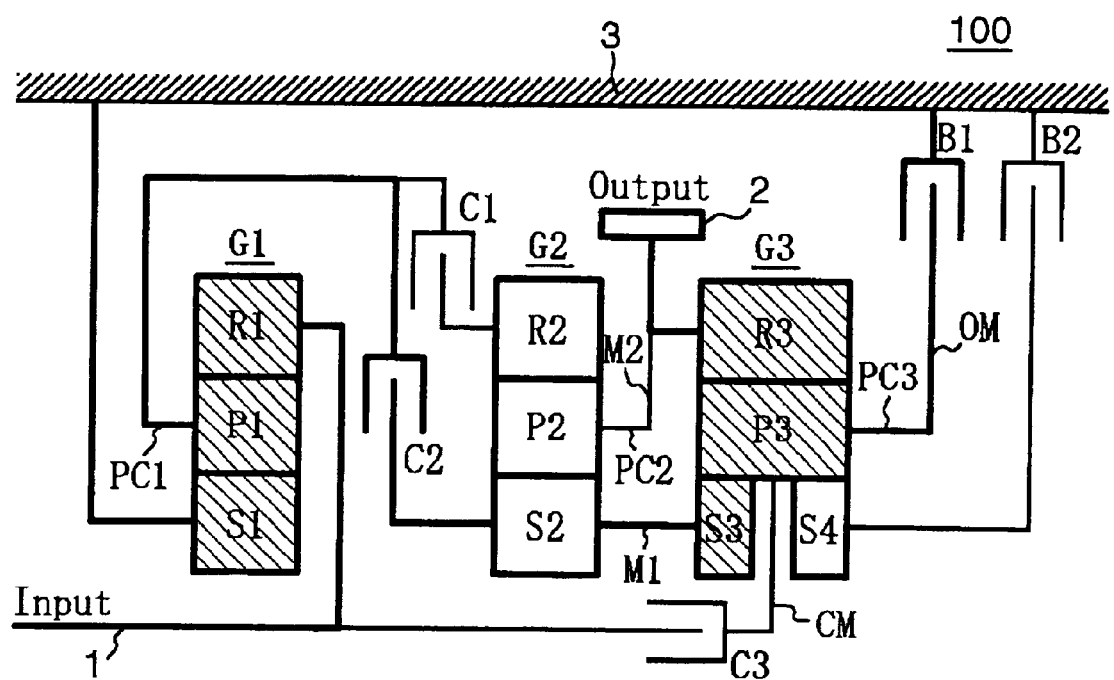
FIG. 9 is a view similar to FIG. 1, but showing a torque transmitting path established in a reverse position of the speed change mechanism of the first embodiment.

Under this condition, as is seen from FIG. 9, due to the engaged condition of the second clutch C2, a reduced speed rotation is fed from the first planetary gear unit G1 to the third sun gear S3 through the second sun gear S2 and the first connecting member M1, and at the same time, due to the engaged condition of the first brake B1, the third pinion carrier PC3 is fixed to the transmission case 3.

Accordingly, into the third sun gear S3, there is inputted a reduced speed rotation in a normal direction, and because of the fixed condition of the third pinion carrier PC3, from the third ring gear R3, there is outputted a reduced speed rotation in a reverse direction to the output gear 2 through the second connecting member M2.

As is seen from FIG. 9, under this reverse position, all of the rotation members of the first and third planetary gear units G1 and G3 except the fourth sun gear S4 are subjected to a torque transmission.

Figure 10:
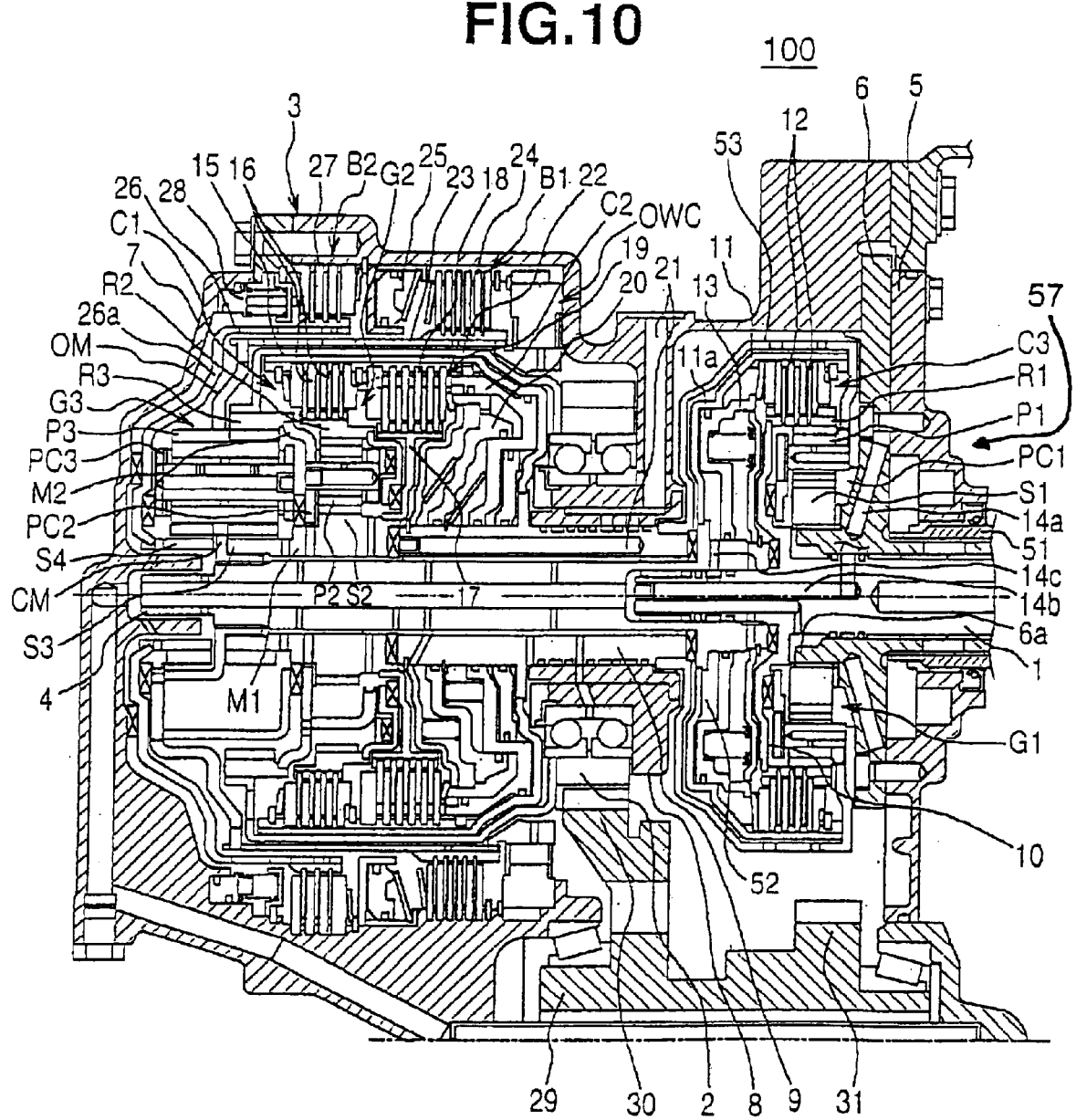
FIG. 10 is a sectional view of the speed change mechanism of the first embodiment.
Figure 11:
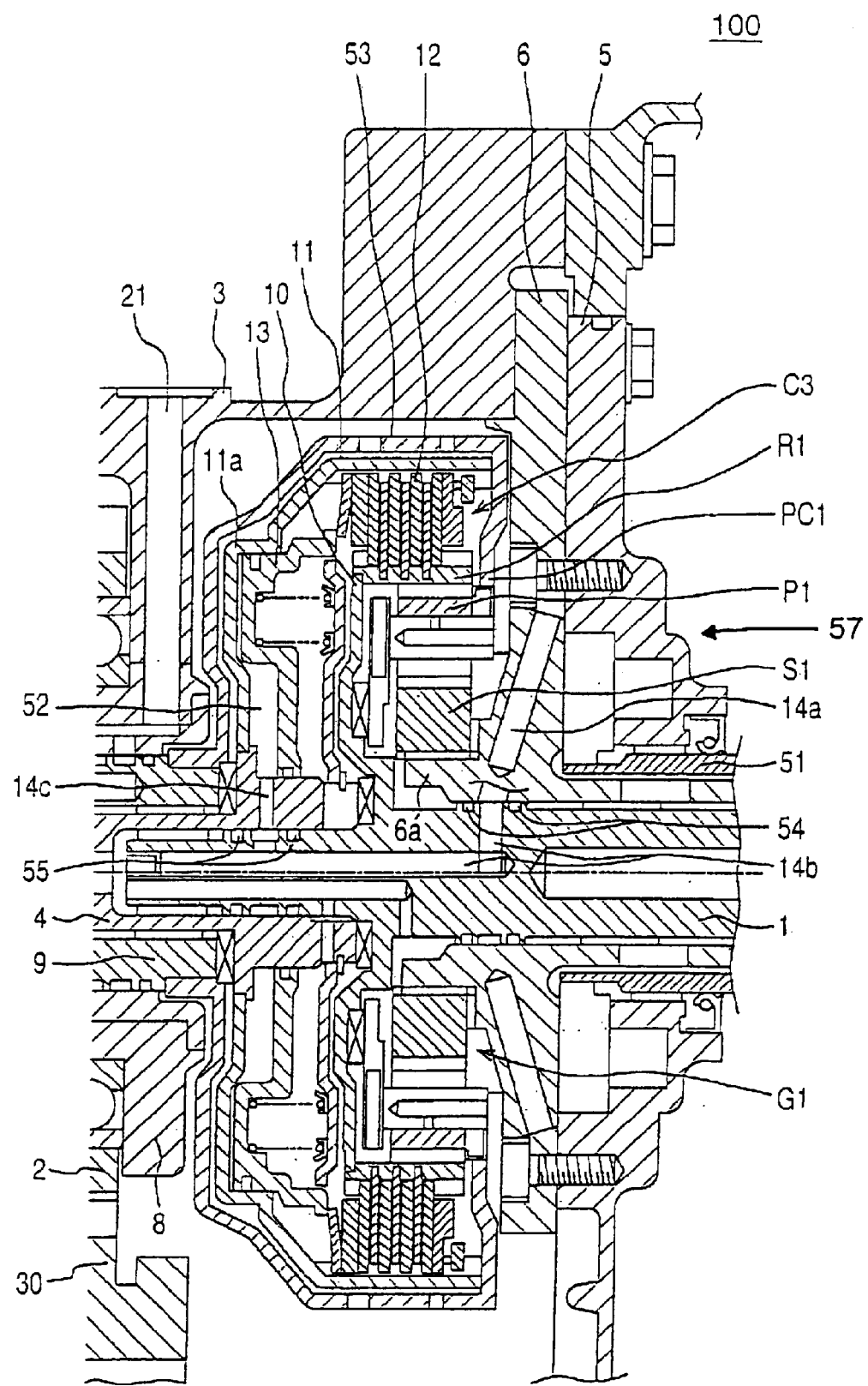
FIG. 11 is an enlarged sectional view of an essential portion of the speed change mechanism of the first embodiment.

Referring to FIGS. 10 and 11, particularly FIG. 10, there is shown but in a sectional manner the speed change mechanism 100 of the first embodiment.

It is to be noted that the arrangement of the parts shown in FIGS. 10 and 11 is opposite to that of FIG. 1. That is, in FIGS. 10 and 11, the input shaft 1 is shown at a right side, while in FIG. 1, the input shaft 1 is shown at a left side.

For ease of understanding, the following description includes various directional terms, such as, left, right, upper, lower and the like. However, these terms are to be understood with respect to only FIGS. 10 and 11.

As is shown in FIG. 10, within the transmission case 3, there are coaxially arranged the input shaft 1 and an intermediate shaft 4.

A pump case including a pump housing 5 and a pump cover 6 is installed in a right (viz., front) open end of the transmission case 3 in a manner to close the same. The input shaft 1 passes through a center of the pump case with a bearing interposed therebetween. Although not shown in the drawing, the input shaft 1 extends rightward in the drawing to a turbine of a torque converter, and an impeller of the torque converter is connected to an output shaft of an internal combustion engine.

Within the pump case, a pump element is operatively installed to constitute an oil pump 57. An input member of the oil pump 57 is driven by the engine through a pump drive shaft 51. Thus, the oil pump 57 is constantly operated when the engine is operating.

A left end of the intermediate shaft 4 is rotatably held by a lid member 7 of the transmission case 3.

At an axially middle portion of the transmission case 3, there is provided an intermediate wall 8 by which the output gear 2 is rotatably held. The intermediate wall 8 is formed with a center opening in which a hollow shaft 9 is installed. A left end of the input shaft 1 and a right end of the intermediate shaft 4 are rotatably held by the hollow shaft 9. More specifically, as is seen from FIG. 11, the hollow shaft 9 rotatably receives therein a right end portion of the intermediate shaft 4, and a left end portion of the input shaft 1 is rotatably received in a cylindrical bore formed in the right end portion of the intermediate shaft 4.

As is best shown by FIG. 11, between the oil pump case (5, 6) and the intermediate wall 8, there are installed the first planetary gear unit G1 and the third clutch C3. The third clutch C3 is arranged to concentrically surround the first planetary gear unit G1.

In the first planetary gear unit G1, the first sun gear S1 is non-rotatably mounted on a cylindrical center boss 6a that projects leftward from a center portion of the pump cover 6. That is, a serration connection is provided between the first sun gear S1 and the cylindrical center boss 6a. Thus, the first sun gear S1 is fixed and thus serves as a reaction force receiver.

The first ring gear R1 is secured to a peripheral end of an annular flange 10 that extends radially outward from the input shaft 1.

A clutch drum 11 is arranged to surround the first ring gear R1, which has a radially inwardly extending left wall 11a that is connected to a right end of the intermediate shaft 4. An annular clutch pack 12 including annular drive and driven clutch plates is concentrically interposed between the clutch drum 11 and the first ring gear R1. One group of the clutch plates are axially movably connected to the clutch drum 11 through a spline connection and the other group of the same are axially movably connected to the first ring gear R1 through a spline connection. With these parts, the third clutch C3 is constituted, which serves as a direct clutch. That is, the third clutch C3 is concentrically disposed around the first planetary gear unit G1. It is to be noted that the first ring gear R1 serves as a clutch hub of the third clutch C3.

For engaging/disengaging the third clutch C3, there is arranged a clutch piston 13 which is positioned away from the pump housing (5, 6), that is, near the left end of the input shaft 1. The clutch piston 13 is axially movably received in a cylindrical recess defined by the radially inwardly extending left wall 11a of the clutch drum 11.

Between the radially inwardly extending left wall 11a and the clutch piston 13, there is formed a work chamber 52 which is connected to a control valve body (not shown) through an oil passage 14c formed in the intermediate shaft 4, an oil passage 14b formed in the input shaft 1 and an oil passage 14a formed in the pump cover 6. These oil passages 14a, 14b and 14c constitute a third clutch operation oil line.

The oil passages 14a and 14b are connected with the aid of seal rings 54 which are hermetically disposed between the input shaft 1 and the pump cover 6, and the oil passages 14b and 14c are connected with the aid of seal rings 55 which are hermetically disposed between the input shaft 1 and the intermediate shaft 4.

Thus, when the work chamber 52 is applied with a hydraulic pressure from the control valve body through the oil passages 14a, 14b and 14c, the clutch piston 13 is moved rightward against a biasing force of a clutch spring (no numeral). Due to this movement of the clutch piston 13, the drive and driven clutch plates of the clutch pack 12 are pressed to each other inducing the engaged condition of the third clutch C3.

As is best seen in FIG. 11, a drum-shaped connecting member 53 is arranged to surround the clutch drum 11, which has a radially inwardly extending left wall of which leading end is connected to the right end of the hollow shaft 9. As shown, a radially inwardly extending right wall of the connecting member 53 is fixed to the first pinion carrier PC1 of the first planetary gear unit G1.

As is seen from FIG. 10, between the intermediate wall 8 and the lid member 7 of the transmission case 3, there are installed the second and third planetary gear units G2 and G3, the first and second clutches C1 and C2 and the first and second brakes B1 and B2.

As shown, the second and third planetary gear units G2 and G3 are disposed around the intermediate shaft 4 placing the second planetary gear unit G2 near the input shaft 1.

The second sun gear S2, the third sun gear S3 and the first connecting member M1 constitute a single unit which is disposed around the intermediate shaft 4.

A clutch drum 15 is arranged to surround the second ring gear R2, which has a radially inwardly extending right wall of which leading end is fixed to a radial flange formed on an axially middle portion of the hollow shaft 9. Between the clutch drum 15 and the second ring gear R2, there is concentrically disposed an annular clutch pack 16 including annular drive and driven clutch plates. One group of the clutch plates are axially movably connected to the clutch drum 15 through a spline connection and the other group of the same are axially movably connected to the second ring gear R2 through a spline connection. The clutch pack 16, the clutch drum 15, the second ring gear R2 and an after-mentioned clutch piston 19 constitute the first clutch C1.

In order to position the second clutch C2 nearer to the input shaft 1 than the first clutch C1 arranged around the second planetary gear unit G2 is, the second sun gear S2 is formed at a right end with a radially extending clutch hub 17, and an annular clutch pack 18 including annular drive and driven clutch plates is operatively disposed between the clutch hub 17 and the clutch drum 15, one group of the clutch plates being axially movably connected to the clutch hub 17 through a spline connection and the other group of the same being axially movably connected to the clutch drum 15 by a spline connection. The clutch pack 18, the clutch hub 17, the clutch drum 15 and an after-mentioned clutch piston 20 constitute the second clutch C2.

The clutch pistons 19 and 20 of the first and second clutches C1 and C2 are arranged at the side of the second clutch C2 as a double piston type. That is, the clutch piston 20 is arranged to slide within the clutch piston 19. For this arrangement, the clutch piston 20 is slidably received in a cylindrical recess defined by the radially inwardly extending right wall of the clutch drum 15, the wall facing the second planetary gear unit G2.

Upon receiving a hydraulic pressure through oil passages 21 formed in the intermediate wall 8 and hollow shaft 9, the clutch pistons 19 and 20 bring about the engaged condition of the first and second clutches C1 and C2 separately.

As has been mentioned hereinabove, the third planetary gear unit G3 is of a double sun gear type. The tooth width of the third ring gear R3 is made smaller than that of the third pinions P3, so that the third ring gear R3 is meshed with the third pinions P3 at an end position near the second planetary gear unit G2. Thus, the second connecting member M2 that connects the third ring gear R3 to the second pinion carrier PC2 can have a reduced length.

Around the third ring gear R3 and the clutch drum 15 of the first and second clutches C1 and C2, there is concentrically arranged a cylindrical connecting member 22 which has a radially inwardly extending left end secured to the third ring gear R3 and a radially inwardly extending right end secured to the output gear 2.

Between the third and fourth sun gears S3 and S4, there extends the center member CM radially inward from the third pinion carrier PC3. The outer member OM extends radially outward along an end surface of the third ring gear R3 from an axially middle portion of the third pinions P3. The center member CM is secured to the intermediate shaft 4, so that the third pinion carrier PC3 is connected to the clutch drum 11 of the third clutch C3 through the center member CM and the intermediate shaft 4.

A brake hub 23 is concentrically arranged around the cylindrical connecting member 22, which has a left end secured to a peripheral end of the outer member OM and a right end positioned near the intermediate wall 8.

Between a right portion of the brake hub 23 and the transmission case 3, there is operatively interposed an annular brake pack 24 which includes annular drive and driven clutch plates, one group being axially movably connected to the brake hub 23 through a spline connection and the other group being axially movably connected to the transmission case 3 through a spline connection. The brake hub 23, the transmission case 3, the brake pack 24 and a clutch piston 25 constitute the first 25 brake B1.

A brake hub 26 is arranged to surround a left end portion of the brake hub 23, which has a radially inwardly extending left wall 26a which extends along a left side of the third planetary gear unit G3. An inner end of the left wall 26a is secured to the fourth sun gear S4.

Between the brake hub 26 and the transmission case 3, there is operatively arranged an annular brake pack 27 which includes annular drive and driven brake plates, one group of the brake plates being axially movably connected to the brake hub 26 through a spline connection and the other group being axially movably connected to the transmission case 3 through a spline connection.

A brake piston 28 is arranged behind the brake pack 27. The brake hub 26, the transmission case 3, the brake pack 27 and the brake piston 28 constitute the second brake B2.

As has been mentioned hereinabove, the first and second brakes B1 and B2 are arranged around the second and first clutches C2 and C1 respectively, the first brake B1 is positioned nearer to the input shaft 1 than the second brake B2 is, and the first and second brakes B1 and B2 are positioned nearer to the second planetary gear unit G2 than the third planetary gear unit G3.

Although not shown in FIGS. 1 and 3 to 9, a one-way clutch OWC is arranged between the brake hub 23 and the transmission case 3, which, with the first brake B1 assuming the disengaged condition, permits only one way rotation of the third pinion carrier PC3 needed in $1^{st}$ forward speed.

However, under the $1^{st}$ forward speed assisted with the one-way clutch OWC, an engine brake is not expected since a reverse rotation of the third pinion carrier PC3 is permitted at the time of the engine brake. Thus, upon need of the engine brake, the first brake B1 is engaged for blocking the reverse rotation of the third pinion carrier PC3.

Within the transmission case 3, there is also installed a countershaft 29 which extends in parallel with the input shaft 1 and the intermediate shaft 4. The countershaft 29 is formed with both a counter gear 30 meshed with the output gear 2 and a final drive pinion 31 meshed with an input gear (not shown) of the differential gear unit.

In the following, advantages of the speed change mechanism 100 of the first embodiment will be described.

The first sun gear S1 of the first (or speed reduction) planetary gear unit G1 is fixed to the center boss 6a of the oil pump case (5, 6), and the clutch piston 13 of the third clutch C3 (viz., direct clutch) is arranged behind the first planetary gear unit G1 with respect to the oil pump case (5, 6). Accordingly, there is no need of providing the side of the gear unit G1 near the oil pump case with a mounting space for the clutch piston 13. Thus, the center boss 6a can be reduced in length accordingly.

Figure 22:
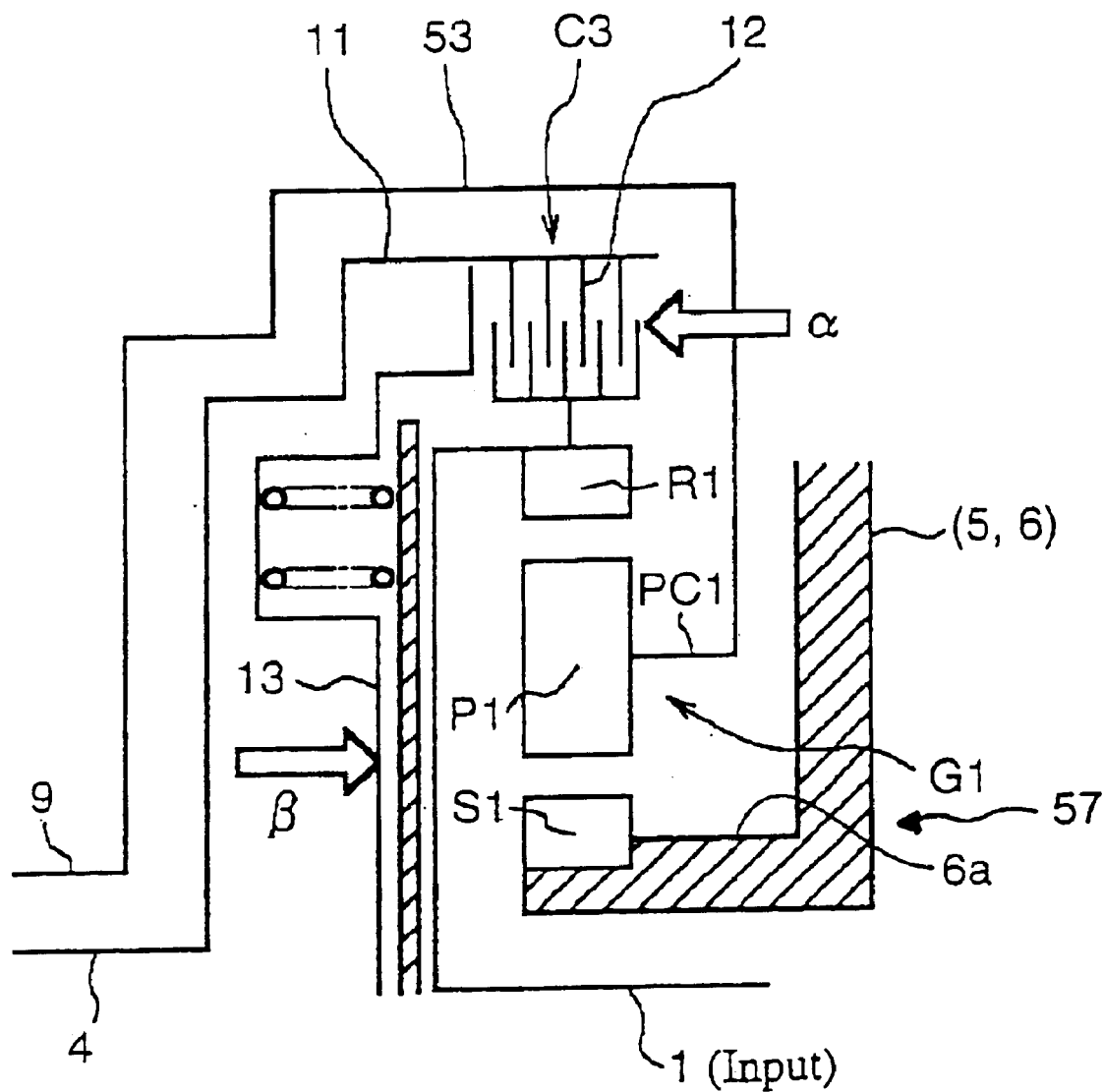
FIG. 22 is a sketch for explaining an advantage possessed by the speed change mechanism of the first embodiment of FIG. 11.

This advantages is readily understood when referring to FIG. 22 in which the arrangement of FIG. 7 is schematically shown. That is, in this first embodiment 100, the clutch piston 13 for the third clutch C3 is placed behind the first planetary gear unit G1, that is, at the position indicated by the arrow "β", not at the position indicated by the arrow "α". If the clutch piston 13 is placed at the position indicated by the arrow "α", it becomes necessary to prepare a mounting space for the clutch piston 13 between the pump case (5, 6) and the gear unit G1, which inevitably induces increase in length of the center boss 6a.

Due to reduction in length of the center boss 6a, the flexural and torsional rigidity of the center boss 6a is increased, and thus, the center boss 6a can exhibit a satisfied holding function against the first sun gear S1 of the first planetary gear unit G1. This provides the pump case (5, 6) with a satisfied mechanical strength keeping a given clearance between the pump element and the pump case normally. Of course, undesired lowering in pumping efficiency is avoided.

Because of the satisfied mechanical strength of the pump case (5, 6) and the center boss 6a, undesired inclination of the first sun gear S1 is suppressed, and thus, the function of the first planetary gear unit G1 is normally kept for a longer time.

Because of the above-mentioned reasons, there is no need of increasing the diameter of the center boss 6a, and thus, enlargement of the speed change mechanism 100 in a radial direction is avoided.

In this first embodiment 100, the input shaft 1 driven by the engine is rotatably supported by the oil pump case (5, 6) and connected to a rotation input member (viz., first ring gear R1) and a direct clutch hub (viz., first ring gear R1) of the speed reduction (viz., first) planetary gear unit G1. Furthermore, the intermediate shaft 4 and the input shaft 1 are coaxially arranged to permit a relative rotation therebetween, and the clutch drum 11 extending radially outward from the intermediate shaft 4 and the clutch piston 13 slidably held by the clutch drum 11 constitute the direct clutch C3. Accordingly, layout of the direct clutch C3 relative to the input shaft 1 and layout of the direct clutch C3 relative to the speed change unit including the second and third planetary gear units G2 and G3 are easily achieved. That is, the direct clutch C3 can be compactly and easily mounted in the speed change mechanism 100.

Oil feeding to the work chamber of the clutch piston 13 of the direct clutch C3 is made through the oil passage 14a of the oil pump case (5, 6), the oil passage 14b of the input shaft 1 and the oil passage 14c of the intermediate shaft 4. Accordingly, even when the clutch piston 13 is arranged in the above-mentioned manner, the oil feeding to the work chamber can be made assuredly like in a conventional mechanism.

For transmitting the reduced speed rotation from the speed reduction planetary gear unit G1 to the speed change unit (G2, G3), the drum-shaped connecting member 53 is arranged around the clutch drum 11, the front end of the connecting member 53 is connected to the first pinion carrier PC1 which is an output rotation member of the gear unit G1 and the rear end of the connecting member 53 is connected to the hollow shaft 9 that is rotatably disposed on the intermediate shaft 4. This arrangement is achieved without enlarging the speed change mechanism 100 in a radial direction.

In a conventional speed change mechanism as has been described hereinafore, an operation piston of the direct clutch is mated with a center boss of the oil pump case to which the sun gear of the speed reduction planetary gear unit is fixed. Thus, in the conventional mechanism, only a seal ring incorporated with the mated portion produced a friction resistance upon rotation of the operation piston. While, in the speed change mechanism 100 of the first embodiment, two sets 54 and 55 of seal rings are used. However, these seal rings 54 and 55 are constructed to have a reduced diameter as compared with the conventional one. Thus, friction resistance produced by the seal rings 54 and 55 is negligible.

In $4^{th}$ to $6^{th}$ forward speeds wherein the direct clutch C3 is engaged due to the work of the direct clutch piston 13, there is no relative rotation between the input shaft 1 and the intermediate shaft 4. Thus, in such forward speeds, only the set of seal rings 54 produces a friction resistance. In view of a fact wherein in practical use $4^{th}$ to $6^{th}$ forward speeds take place for a longer time as compared with the other forward speeds, the friction resistance of the seal rings 54 and 55 can be reduced in total.

FIG. 8 shows schematically a speed change mechanism 200 of the second embodiment of the present invention.

In the drawing, substantially the same parts as those of the above-mentioned first embodiment 100 are denoted by the same reference numerals.

As shown in the drawing, the speed change mechanism 200 comprises generally a first planetary gear unit G1, a second planetary gear unit G2 of a single pinion type, and a third planetary gear unit G3 of a double sun gear type, which are coaxially arranged in order from an input shaft 1.

A speed change unit including the second and third planetary gear units G2 and G3 is the same as that in the above-mentioned first embodiment 100, as shown.

While, the first planetary gear unit G1 used in this second embodiment 100 is of a double pinion type, which comprises a first sun gear S1, a first ring gear R1, first-a pinions P1a, first-b pinions P1b and a first pinion carrier PC1 that carries the first-a and first-b pinions P1a and P1b. The first-a and first-b pinions P1a and P1b are each engaged with both the first sun gear S1 and the first ring gear R1.

As shown in FIG. 8, the input shaft 1 is connected to the first pinion carrier PC1, so that the first pinion carrier PC1 serves as a rotation input member to which the engine rotation is applied. The first pinion carrier PC1 is connectable to a center member CM through a third clutch C3. The first sun gear S1 is connected to a transmission case 3 and thus fixed. The first ring gear R1 serving as a rotation output member is connectable to a second ring gear R2 of the second planetary gear unit G2 through a first clutch C1 and connectable to a second sun gear S2 through a second clutch C2 of the second planetary gear unit G2.

Like in the above-mentioned first embodiment 100, when the friction elements (viz., clutches C1, C2 and C3 and brakes B1 and B2) are engaged or disengaged by the hydraulically actuating devices in a way as is indicated by the Table of FIG. 2, six forward speeds and one reverse position are selectively obtained by the speed change mechanism 200.

In the following, operation of the speed change mechanism 200 will be described with reference to FIGS. 13 to 19 which respectively show 7 types of torque transmitting path established in $1^{st}$, $2^{nd}$, $3^{rd}$, $4^{th}$, $5^{th}$ and $6^{th}$ forward speeds and reverse position of the speed change mechanism 200. In the drawings, each torque transmitting path is indicated by hatched blocks and thicker lines.

$1^{st}$ Forward Speed

As is seen from the Table of FIG. 2, in this forward speed, only the first clutch C1 and first brake B1 assume their engaged condition.

The operation carried out in this forward speed is substantially the same as that in the above-mentioned first embodiment 100, and thus description of it will be omitted.

Figure 13:
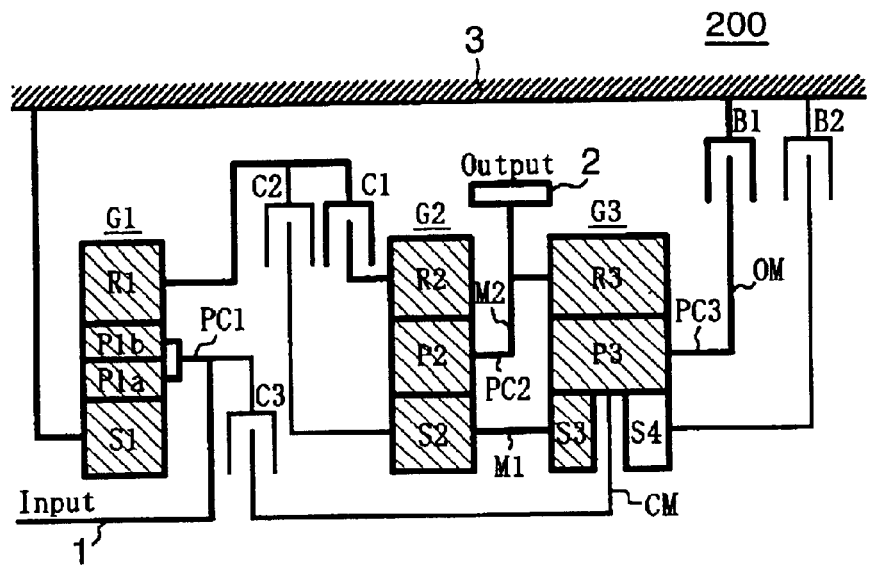
FIGS. 13 to 18 are views similar to FIG. 12, but showing torque transmitting paths established in $1^{st}$, $2^{nd}$, $3^{rd}$, $4^{th}$, $5^{th}$ and $6^{th}$ forward speeds of the speed change mechanism of the second embodiment, respectively.

As is seen from FIG. 13, under this $1^{st}$ forward speed, all of the rotation members of the first, second and third planetary gear units G1, G2 and G3 except the fourth sun gear S4 are subjected to a torque transmission.

$2^{nd}$ Forward Speed

As is seen from the Table of FIG. 2, in this forward speed, only the first clutch C1 and second brake B2 assume their engaged condition.

The operation carried out in this forward speed is substantially the same as that in the above-mentioned first embodiment 100, and thus description of it will be omitted.

Figure 14:
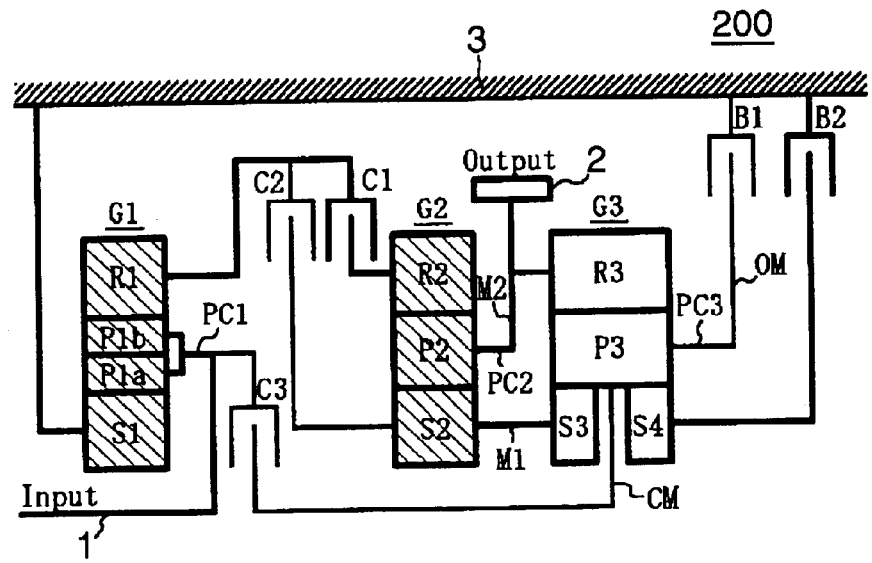

As is seen from FIG. 14, under this $2^{nd}$ forward speed, all of the rotation members of the first and second planetary gear units G1 and G2 are subjected to a torque transmission.

In this $2^{nd}$ forward speed, the released third pinions P3 are turned freely about the fixed third and fourth sun gears S3 and S4 in accordance with rotation of the third ring gear R3, and thus the third planetary gear unit G3 is not subjected to a torque transmission.

$3^{rd}$ Forward Speed

As is seen from the Table of FIG. 2, in this forward speed, only the first clutch C1 and second clutch C2 assume their engaged condition.

The operation carried out in this forward speed is substantially the same as that in the above-mentioned first embodiment 100, and thus description of it will be omitted.

Figure 15:
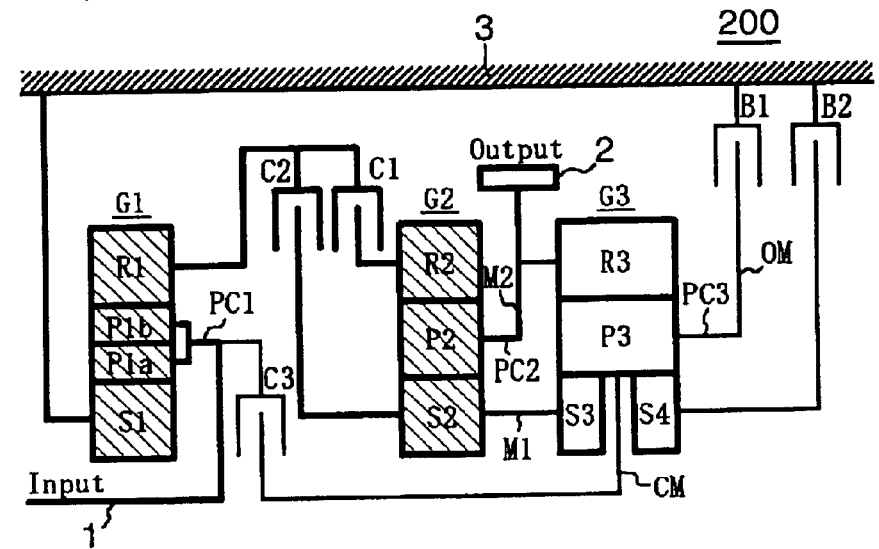

As is seen from FIG. 15, under this $3^{rd}$ forward speed, all of the rotation members of the first and second planetary gear units G1 and G2 are subjected to a torque transmission. The third planetary gear unit G3 is not subjected to a torque transmission, like in the $2^{nd}$ forward speed.

$4^{th}$ Forward Speed

As is seen from the Table of FIG. 2, in this forward speed, only the first clutch C1 and the third clutch C3 assume their engaged condition.

The operation carried out in this forward speed is substantially the same as that in the above-mentioned first embodiment 100, and thus description of it will be omitted.

Figure 16:
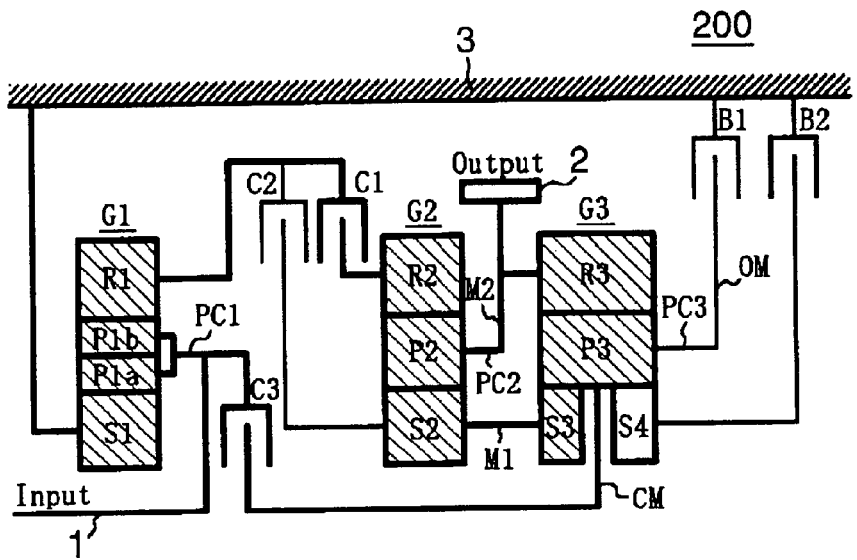

As is seen from FIG. 16, under this $4^{th}$ forward speed, all of the rotation members of the first, second and third planetary gear units G1, G2 and G3 except the fourth sun gear S4 are subjected to a torque transmission.

$5^{th}$ Forward Speed

As is seen from the Table of FIG. 2, in this forward speed, only the second clutch C2 and third clutch C3 assume their engaged condition.

The operation carried out in this forward speed is substantially the same as that in the above-mentioned first embodiment 100, and thus description of it will be omitted.

Figure 17:
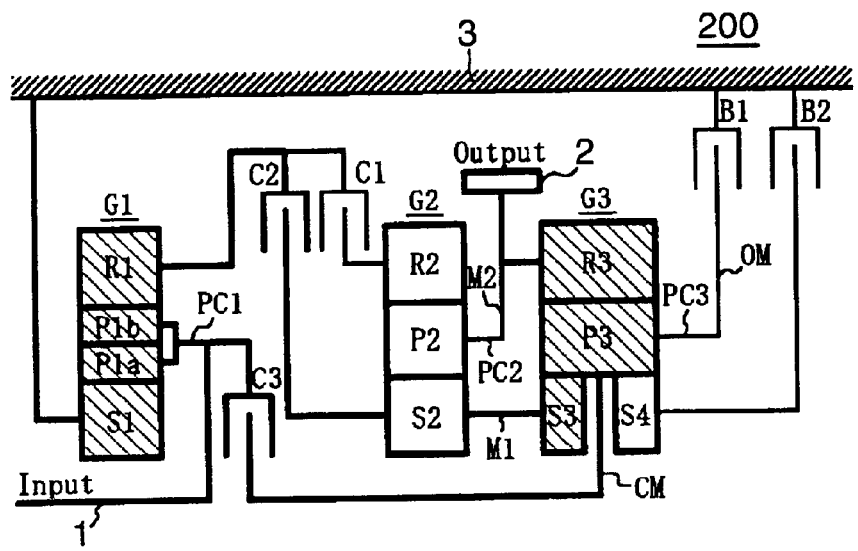

As is seen from FIG. 17, under this $5^{th}$ forward speed, all of the rotation members of the first and third planetary gear units G1 and G3 except the fourth sun gear S4 are subjected to a torque transmission.

$6^{th}$ Forward Speed

As is seen from the Table of FIG. 2, in this forward speed, only the third clutch C3 and second brake B2 assume their engaged condition.

The operation carried out in this forward speed is substantially the same as that in the above-mentioned first embodiment 100, and thus description of it will be omitted.

Figure 18:
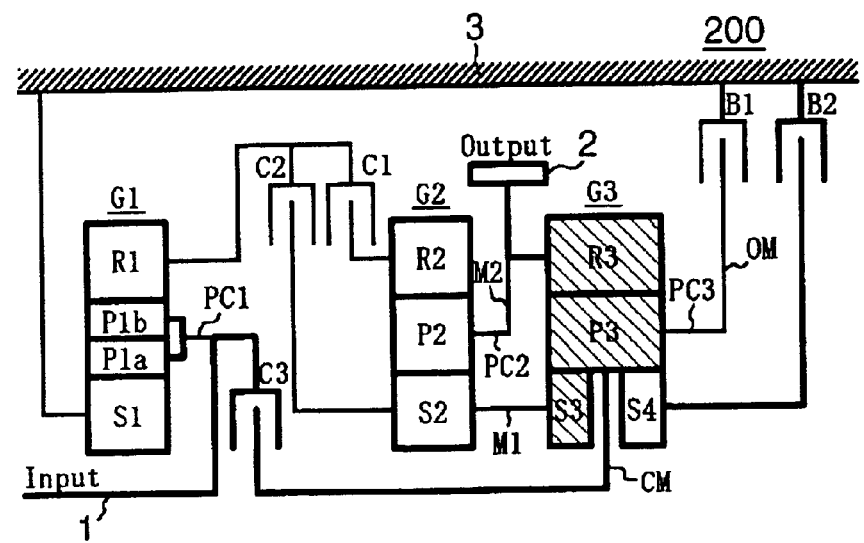

As is seen from FIG. 18, under this $6^{th}$ forward speed, all of the rotation members of the third planetary gear unit G3 except the third sun gear S3 are subjected to a torque transmission.

Reverse Position

As is seen from the Table of FIG. 2, in this reverse position, only the second clutch C2 and first brake B1 assume their engaged condition.

The operation carried out in this forward speed is substantially the same as that in the above-mentioned first embodiment 100, and thus description of it will be omitted.

Figure 19:
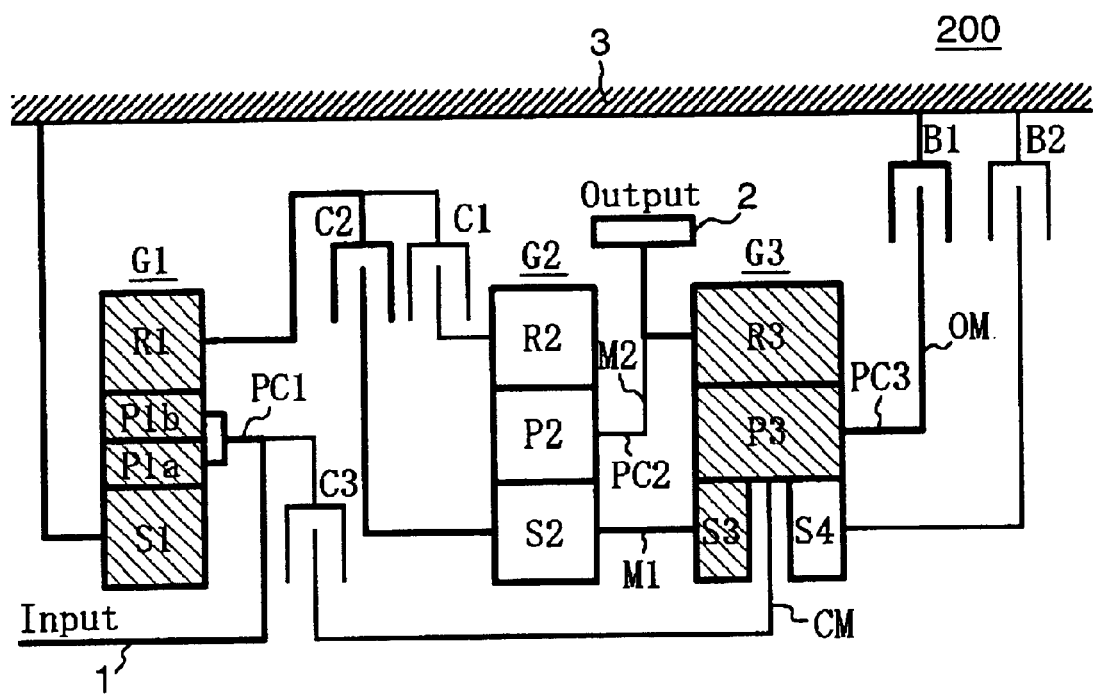
FIG. 19 is a view similar to FIG. 12, but showing a torque transmitting path established in a reverse position of the speed change mechanism of the second embodiment.

As is seen from FIG. 19, under this reverse position, all of the rotation members of the first and third planetary gear units G1 and G3 except the fourth sun gear S4 are subjected to a torque transmission.

Figure 20:
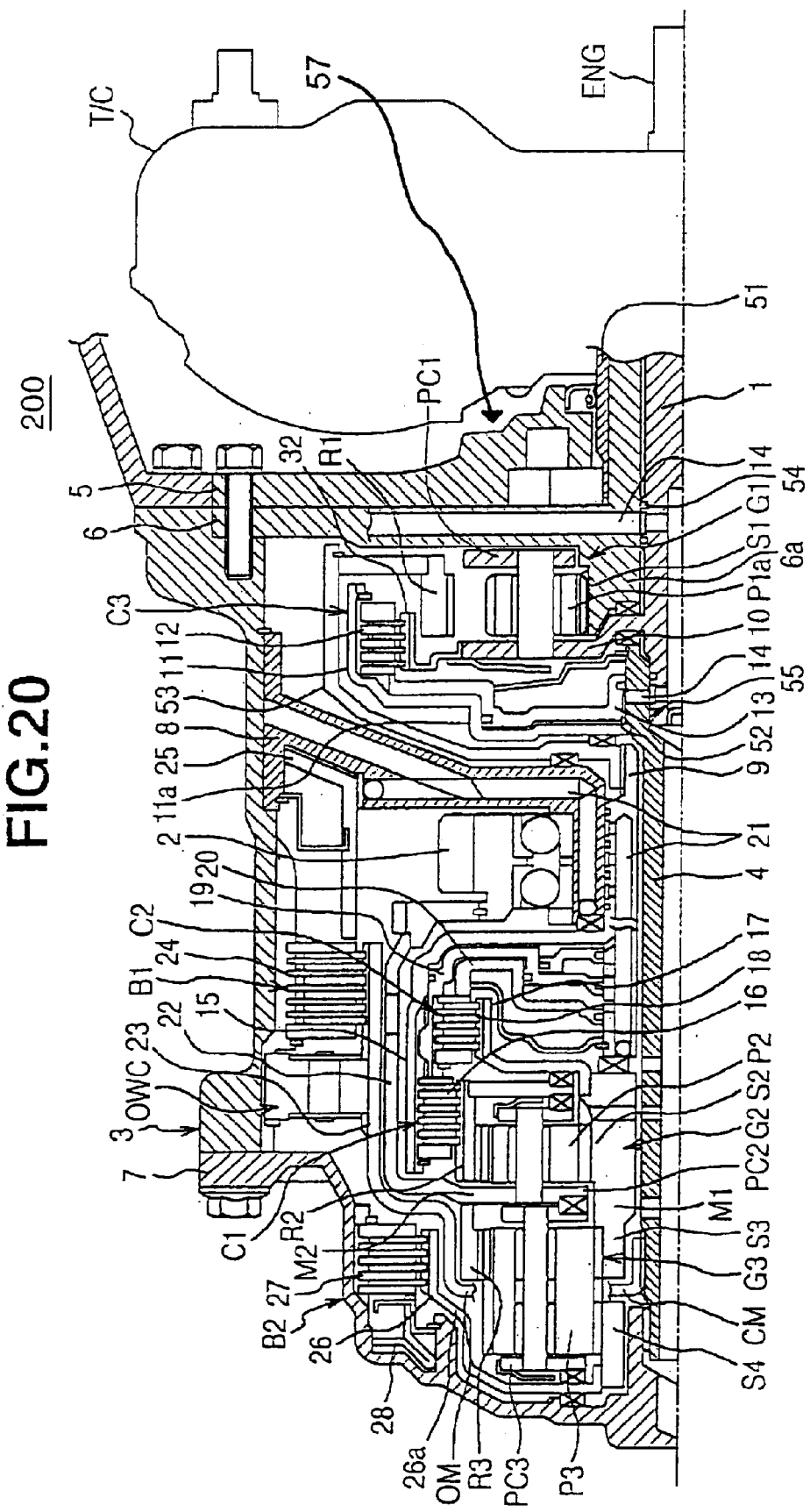
FIG. 20 is a sectional view of the speed change mechanism of the second embodiment.
Figure 21:
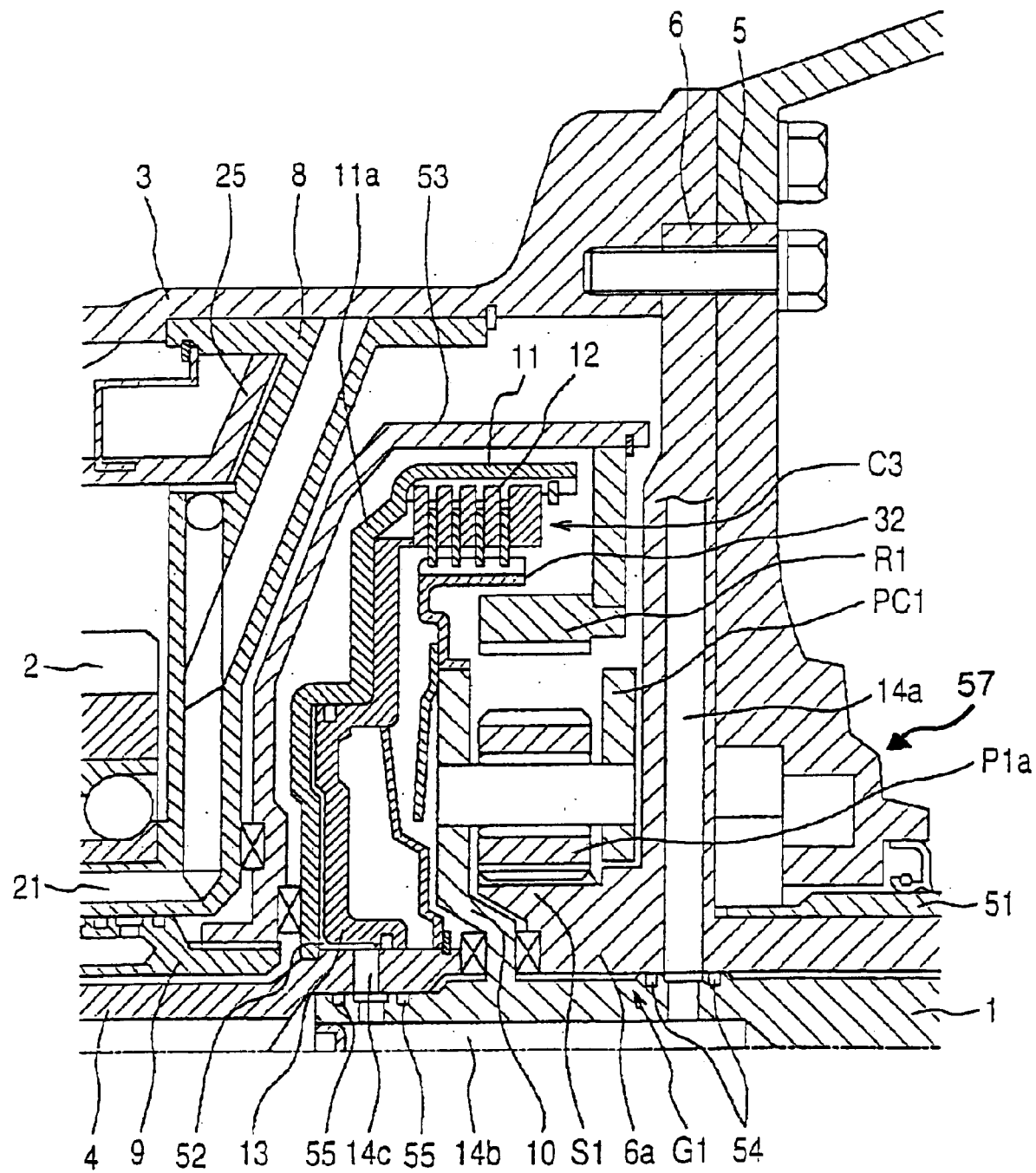
FIG. 21 is an enlarged sectional view of an essential portion of the speed change mechanism of the second embodiment.

Referring to FIGS. 20 and 21, particularly FIG. 20, there is shown but in a sectional manner the speed change mechanism 200 of the second embodiment.

Figure 12:
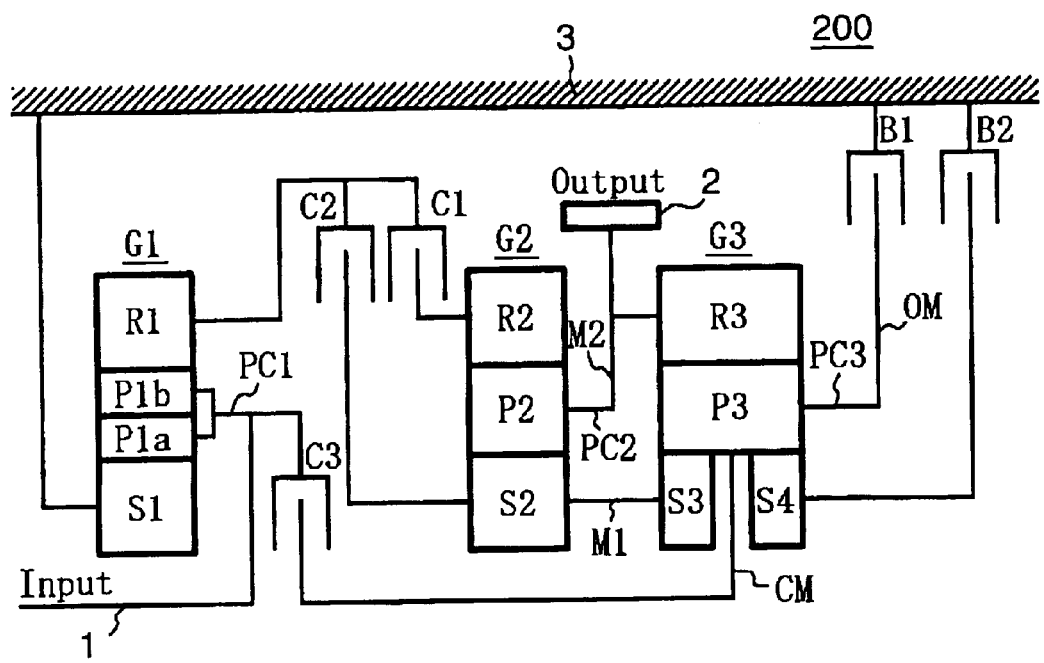
FIG. 12 is a schematic view of a speed change mechanism of an automatic transmission, which is a second embodiment of the present invention.

It is to be noted that the arrangement of the parts shown in FIGS. 20 and 21 is opposite to that of FIG. 12. That is, in FIGS. 20 and 21, the input shaft 1 is shown at a right side, while in FIG. 12, the input shaft 1 is shown at a left side.

For ease of understanding, the following description includes various directional terms, such as, left, right, upper lower and the like. However, these terms are to be understood with respect to only FIGS. 20 and 21.

As is shown in FIG. 20, within the transmission case 3, there are coaxially arranged the input shaft 1 and the intermediate shaft 4.

A pump case including a pump housing 5 and a pump cover 6 is installed in a front (viz., front) open end of the transmission case 3 in a manner to close the same. The input shaft 1 passes through a center of the pump case with a bearing interposed therebetween. The input shaft 1 extends rightward in the drawing to a turbine of a torque converter T/C, and an impeller of the torque converter T/C is connected to an output shaft of an internal combustion engine ENG.

Within the pump case, a pump element is operatively installed to constitute an oil pump. An input member of the oil pump is driven by the engine through a pump drive shaft 51. Thus, the oil pump is constantly operated when the engine is operating.

A left end of the intermediate shaft 4 is rotatably held by a lid member 7 of the transmission case 3.

At an axially middle portion of the transmission case 3, there is provided an intermediate wall 8 by which the output gear 2 is rotatably held. The intermediate wall 8 is formed with a center opening in which a hollow shaft 9 is installed. A left and of the input shaft 1 and a right end of the intermediate shaft 4 are rotatably held by the hollow shaft 9. More specifically, as is seen from FIG. 21, the hollow shaft 9 rotatably receives therein a right end portion of the intermediate shaft 4 and, a left end portion of the input shaft 1 is rotatably received in a cylindrical bore formed in the right end portion of the intermediate shaft 4.

As is best seen from FIG. 21, between the oil pump case (5, 6) and the intermediate wall 8, there are installed the first planetary gear unit G1 and the third clutch C3. The third clutch C3 is arranged to concentrically surround the first planetary gear unit G1.

As is seen from FIG. 21, the first sun gear S1 is formed on a cylindrical center boss 6a which is projected leftward from a center portion of the pump cover 6. That is, the first sun gear S1 is fixed and thus serves as a reaction force receiver.

The first pinion carrier PC1 is integral with an annular flange 10 that extends radially outward from the input shaft 1. Around the first pinion carrier PC1, there is concentrically arranged a clutch hub 32.

A clutch drum 11 is arranged to surround both the first ring gear R1 and the clutch 32, which has a radially inwardly extending left wall that is connected to a right end of the intermediate shaft 4. An annular clutch pack 12 including annular drive and driven clutch plates is concentrically interposed between the clutch drum 11 and the clutch hub 32. One group of the clutch plates are axially movably connected to the clutch drum 11 through a spline connection and the other group of the same are axially movably connected to the clutch hub 32 through a spline connection. With these parts, the third clutch C3 is constituted, which serves as a direct clutch.

For engaging/disengaging the third clutch C3, there is arranged a clutch piston 13 which is positioned away from the pump housing (5, 6), that is, near the left end of the input shaft 1. The clutch piston 13 is axially movably received in a cylindrical recess defined by the radially inwardly extending left wall 11a of the clutch drum 11.

Between the radially inwardly extending left wall 11a and the clutch piston 13, there is formed a work chamber 52 which is connected to a control valve body (not shown) through an oil passage 14c formed in the intermediate shaft 4, an oil passage 14b formed in the input shaft 1 and an oil passage 14a formed in the pump cover 6. These oil passages 14a, 14b and 14c constitute a third clutch operation oil line.

The oil passages 14a and 14b are connected with the aid of seal rings 54 which are hermetically disposed between the input shaft 1 and the pump cover 6, and the oil passages 14b and 14c are connected with the aid of seal rings 55 which are hermetically disposed between the input shaft 1 and the intermediate shaft 4.

Thus, when the work chamber 52 is applied with a hydraulic pressure from the control valve body through the passages 14a, 14b and 14c, the clutch piston 13 is moved rightward against a biasing force of a clutch spring (no numeral). Due to this movement of the clutch piston 13, the drive and driven clutch plates of the clutch pack 12 are pressed to each other inducing the engaged condition of the third clutch C3.

As is best seen in FIG. 21, a drum-shaped connecting member 53 is arranged to surround the clutch drum 11, which has a radially inwardly extending left wall of which leading end is connected to the right end of the hollow shaft 9. As shown, a radially inwardly extending right wall of the connecting member 53 is fixed to the first ring gear R1.

As is seen from FIG. 20, between the intermediate wall 8 and the lid member 7, there are installed the second and third planetary gear units G2 and G3, the first and second clutches C1 and C2 and the first and second brakes B1 and B2.

As shown, the second and third planetary gear units G2 and G3 are disposed around the intermediate shaft 4 placing the second planetary gear unit G2 near the input shaft 1.

The second sun gear S2, the third sun gear S3 and the first connecting member M1 constitute a single unit which is disposed around the intermediate shaft 4.

A clutch drum 15 is arranged to surround the second ring gear R2, which has a radially inwardly extending right wall of which leading end is fixed to a radial flange formed on an axially middle portion of the hollow shaft 9. Between the clutch drum 15 and the second ring gear R2, there is concentrically disposed an annular clutch pack 16 including annular drive and driven clutch plates. One group of the clutch plates are axially movably connected to the clutch drum 15 through a spline connection and the other group of the same are axially movably connected to the second ring gear R2 through a spline connection. The clutch pack 16, the clutch drum 15, the second ring gear R2 and an after-mentioned clutch piston 19 constitute the first clutch C1.

In order to position the second clutch C2 nearer to the input shaft 1 than the first clutch C1 arranged around the second planetary gar unit G2 is, the second sun gear S2 is formed at a right end with a radially extending clutch hub 17, and an annular clutch pack 18 including annular drive and driven clutch plates is operatively disposed between the clutch hub 17 and the clutch drum 15, one group of the clutch plates being axially movably connected to the clutch hub 17 through a spline connection and the other group of the same being axially movably connected to the clutch drum 15 through a spline connection. The clutch pack 18, the clutch hub 17, the clutch drum 15 and an after-mentioned clutch piston 20 constitute the second clutch C2.

The clutch pistons 19 and 20 of the first and second clutches C1 and C2 are arranged at the side of the second clutch C2 as a double piston type. That is, the clutch piston 20 is arranged to slide within the clutch piston 19. For this arrangement, the clutch piston 20 is slidably received in a cylindrical recess defined by the radially inwardly extending right wall of the clutch drum 15, the wall facing the second planetary gear unit G2.

Upon receiving a hydraulic pressure through oil passages 21 formed in the intermediate wall 8 and hollow shaft 9, the clutch pistons 19 and 20 bring bout the engaged condition of the first and second clutches C1 and C2 separately.

As has been mentioned hereinabove, the third planetary gear unit G3 is of a double sun gear type. The tooth width of the third ring gear R3 is made smaller than that of the third pinions P3, so that the third ring gear R3 is meshed with the third pinions P3 at an end position near the second planetary gear unit G2. Thus, the second connecting member M2 that connects the third ring gear R3 to the second pinion carrier PC2 can be reduced in length.

Around the second connecting member M2 and the clutch drum 15 of the first and second clutches C1 and C2, there is concentrically arranged a cylindrical connecting member 22 which has a radially extending left end secured to the second pinion carrier PC2 and a radially inwardly extending right end secured to the output gear 2.

Between the third and fourth sun gears S3 and S4, there extends the center member CM radially inward from the third pinion carrier PC3. The outer member OM extends radially outward along an end surface of the third ring gear R3 from an axially middle portion of the third pinions P3. The center member CM is secured to the intermediate shaft 4, so that the third pinion carrier PC3 is connected to the clutch drum 11 of the third clutch C3 through the center member CM and the intermediate shaft 4.

A brake hub 23 is concentrically arranged around the cylindrical connecting member 22, which has a left end secured to a peripheral end of the outer member OM and a right end positioned near the intermediate wall 8.

Between a right portion of the brake hub 23 and the transmission case 3, there is operatively interposed an annular brake pack 24 which includes annular drive and driven clutch plates, one group being axially movably connected to the brake hub 23 through a spline connection and the other group being axially movably connected to the transmission case 3 through a spline connection. The brake hub 23, the transmission case 3, the brake pack 24 and a clutch piston 25 constitute the first brake B1.

A brake hub 26 is arranged to surround a left end portion of the brake hub 23, which has a radially inwardly extending left wall 26a which extends along a left side of the third planetary gear unit G3. An inner end of the left wall 26a is secured to the fourth sun gear S4.

Between the brake hub 26 and the transmission case 3, there is operatively arranged an annular brake pack 27 which includes annular drive and driven brake plates, one group of the brake plates being axially movably connected to the brake hub 26 through a spline connection and the other group being axially movably connected to the transmission case 3 through a spline connection.

A brake piston 28 is arranged behind the brake pack 27. The brake hub 26, the transmission case 3, the brake pack 27 and the brake piston 28 constitute the second brake B2.

As has been mentioned hereinabove, the first brake B1 is arranged to surround the first and second clutches C1 and C2, and the second brake B2 is arranged to surround the third planetary gear unit G3, and the first brake B1 is positioned near to the input shaft 1 than the second brake B2 is.

Although not shown in FIGS. 12 to 19, a one-way clutch OWC is arranged between the brake hub 23 and the transmission case 3, which, with the first brake B1 assuming the disengaged condition, permits only one way rotation of the third pinion carrier PC3 needed in $1^{st}$ forward speed.

However, under the $1^{st}$ forward speed assisted with the one-way clutch OWC, an engine brake is not expected since a reverse rotation of the third pinion carrier PC3 is permitted at the time of the engine brake. Thus, upon need of the engine brake, the first brake B1 is engaged for blocking the reverse rotation of the third pinion carrier PC3.

Within the transmission case 3, there is also installed a countershaft (not shown) that is like the countershaft 29 shown in FIG. 6. The countershaft extends in parallel with the input shaft 1 and the intermediate shaft 4. Like the countershaft 29, a counter gear meshed with the output gear 2 and a final drive pinion meshed with an input gear of the differential gear unit are integrally formed on the countershaft.

In the following, advantages of the speed change mechanism 200 of the second embodiment will be described.

As is seen from FIG. 21, the first sun gear S1 is formed on the cylindrical center boss 6a projected leftward from the center portion of the pump case (5, 6), and the clutch piston 13 of the third clutch C3 (viz., direct clutch) is arranged behind the first planetary gear unit G1 with respect to the oil pump case (5, 6). Accordingly, there is no need of providing the side of the gear unit G1 near the oil pump case (5, 6) with a mounting space for the clutch piston 13. Thus, the center boss 6a can be reduced in length accordingly.

This advantage may be readily understood when referring to FIG. 22 which shows a case of the above-mentioned first embodiment 100. That is, in the second embodiment 200, the input shaft 1 is connected to the first pinion carrier PC1. It is to be noted that also in the second embodiment 200, the clutch piston 13 for the third clutch C3 is placed at the position indicated by the arrow "β", not at the position indicated by the arrow "α". If the clutch piston 13 is placed at the position indicated by the arrow "α", it becomes necessary to prepare a mounting space for the clutch piston 13 between the pump case (5, 6) and the gear unit G1, which inevitably induces increase in length of the center boss 6a.

Due to reduction in length of the center boss 6a, the flexural and torsional rigidity of the center boss 6a is increased, and thus, the center boss 6a can exhibit a satisfied holding function against the first sun gear S1 of the first planetary gear unit G1. This provides the pump case (5, 6) with a satisfied mechanical strength keeping a given clearance between the pump element and the pump case normally. Of course, undesired lowering in pumping efficiency is avoided.

Because of the satisfied mechanical strength of the pump case (5, 6) and the center boss 6a, undesired inclination of the first sun gear S1 integral with the center boss 6a is suppressed, and thus, the function of the first planetary gear unit G1 is normally kept for a longer time.

Because of the above-mentioned reasons, there is no need of increasing the diameter of the center boss 6a, and thus, enlargement of the speed change mechanism 200 in a radial direction is avoided.

In this second embodiment 200, the input shaft 1 driven by the engine is rotatably supported by the oil pump case (5, 6) and connected to a rotation input member (viz., first pinion carrier PC1) and the direct clutch hub 32 of the speed reduction (viz., first) planetary gear unit G1. Furthermore, the intermediate shaft 4 and the input shaft 1 are coaxially arranged to permit a relative rotation therebetween, and the clutch drum 11 extending radially outward from the intermediate shaft 4 and the clutch piston 13 slidably held by the clutch drum 11 constitute the direct clutch C3. Accordingly, layout of the direct clutch C3 relative to the input shaft 1 and layout of the direct clutch C3 relative to the speed change unit including the second and third planetary gear units G2 and G3 are easily achieved. That is, the direct clutch C3 can be compactly and easily mounted in the speed change mechanism 200.

Oil feeding to the work chamber of the clutch piston 13 of the direct clutch C3 is made through the oil passage 14a of the oil pump case (5, 6), the oil passage 14b of the input shaft 1 and the oil passage 14c of the intermediate shaft 4. Accordingly, even when the clutch piston 13 is arranged in the above-mentioned manner, the oil feeding to the work chamber can be made assuredly like in the conventional manner.

For transmitting the reduced speed rotation from the speed reduction planetary gear unit G1 to the speed change unit (G2, G3), the drum-shaped connecting member 53 is arranged around the clutch drum 11, the front end of the connecting member 53 is connected to the first ring gear R1 which is an output rotation member of the gear unit G1 and the rear end of the connecting member 53 is connected to the hollow shaft 9 that is rotatably disposed on the intermediate shaft 4. This arrangement is achieved without enlarging the speed change mechanism 200 in a radial direction.

In the speed change mechanism 200, two sets 54 and 55 of seal rings are used. However, these seal rings 54 and 55 are constructed to have a reduced diameter as compared with that of the above-mentioned conventional speed change mechanism. Thus, friction resistance produced by the seal rings 54 and 55 is negligible.

In $4^{th}$ to $6^{th}$ forward speeds wherein the direct clutch C3 is engaged due to the work of the direct clutch piston 13, there is no relative rotation between the input shaft 1 and the intermediate shaft 4. Thus, in such forward speeds, only the set of seal rings 54 produces a friction resistance. Considering such a fact that in practical use $4^{th}$ to $6^{th}$ forward speeds take place for a longer time as compared with the other forward speeds, the friction resistance of the seal rings 54 and 55 can be reduced in total.

The entire contents of Japanese Patent Application 2002-207381 (filed Jul. 16, 2002) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A speed change mechanism of an automatic transmission, comprising:

a first planetary gear unit which includes a sun gear, a rotation input member and a rotation output member, the first planetary gear unit outputting a reduced speed rotation from the rotation output member upon receiving a rotation from a prime mover by the rotation input member;

a speed change unit to which the reduced speed rotation is applied from the rotation output member of the first planetary gear unit, the speed change unit being arranged at an opposite position of the prime mover with respect to the first planetary gear unit;

an oil pump arranged between the first planetary gear unit and the prime mover and driven by the prime mover, the oil pump including a case to which the sun gear of the first planetary gear unit is connected;

friction elements which selectively engage and disengage the rotation input and output members of the first planetary gear unit and rotation members of the speed change unit for achieving a desired speed position; and a direct clutch arranged to directly transmit the rotation from the prime mover to the speed change unit, the direct clutch including an annular clutch pack which is concentrically disposed around the first planetary gear unit and a clutch piston which is arranged at an opposite position of the oil pump with respect to the first planetary gear unit for actuating the annular clutch pack.

2. A speed change mechanism as claimed in claim 1, in which the clutch piston is arranged between the first planetary gear unit and the speed change unit.

3. A speed change mechanism as claimed in claim 1, further comprising:

an input shaft rotatably supported by the case of the oil pump, the input shaft being connected to the rotation input member of the first planetary gear unit;

an intermediate shaft coaxially aligned with the input shaft permitting a relative rotation therebetween, the intermediate shaft being arranged to concentrically mount thereabout the speed change unit; and a clutch drum radially outwardly extending from the intermediate shaft.

4. A speed change mechanism as claimed in claim 3, in which the clutch drum includes a cylindrical recess in which the clutch piston of the direct clutch is slidably received to define therebetween a work chamber for the direct clutch.

5. A speed change mechanism as claimed in claim 4, in which the direct clutch further comprises a clutch operation oil line through which a hydraulic pressure is fed to the work chamber, the clutch operation oil line including an oil passage formed in the case of the oil pump, an oil passage formed in the input shaft and an oil passage formed in the intermediate shaft.

6. A speed change mechanism as claimed in claim 3, further comprising:

an hollow shaft in which the intermediate shaft is rotatably received; and a drum-shaped connecting member arranged to surround the clutch drum, one end of the connecting member being connected to the rotation output member of the first planetary gear unit and the other end of the connecting member being connected to the hollow shaft.

7. A speed change mechanism as claimed in claim 1, in which the rotation input member of the first planetary gear unit is a ring gear and the rotation output member of the first planetary gear unit is a pinion carrier.

8. A speed change mechanism as claimed in claim 1, in which the rotation input member of the first planetary gear unit is a pinion carrier and the rotation output member of the first planetary gear unit is a ring gear.

9. A speed change mechanism as claimed in claim 7, in which the first planetary gear unit is of a single pinion type, which includes the sun gear, the ring gear, pinions each being meshed with both the sun gear and the ring gear and the pinion carrier.

10. A speed change mechanism as claimed in claim 8, in which the first planetary gear unit is of a double pinion type, which comprises the sun gear, the ring gear, first and second groups of pinions each being meshed with both the sun gear and the ring gear and the pinion carrier.

11. A speed change mechanism as claimed in claim 1, in which the speed change unit comprises:

a second planetary gear unit of a single pinion type which includes a sun gear, a ring gear, pinions each being meshed with both the sun gear and the ring gear and a pinion carrier carrying the pinions; and a third planetary gear unit of a double sun gear type which includes two sun gears, a ring gear, pinions each being meshed with the two sun gears and the ring gear and a pinion carrier carrying the pinions.

12. A speed change mechanism as claimed in claim 1, in which the case of the oil pump is formed with a cylindrical center boss about which the sun gear of the first planetary gear unit is non-rotatably disposed through a serration connection therebetween.

13. A speed change mechanism as claimed in claim 1, in which the case of the oil pump is formed with a cylindrical center boss which is integrally formed with the sun gear of the first planetary gear unit.

* * * * *